United States Patent
Dunay et al.

(10) Patent No.: US 12,183,058 B2
(45) Date of Patent: Dec. 31, 2024

(54) SYSTEMS AND METHODS FOR TRAINING AND USING A MACHINE LEARNING MODEL FOR MATCHING OBJECTS

(71) Applicant: Shopify Inc., Ottawa (CA)

(72) Inventors: Shaked Dunay, Rehovot (IL); Adam Malloul, Rishon LeTsiyon (IL); Roni Gurvich, Ramat Gan (IL)

(73) Assignee: Shopify Inc., Ottawa (CA)

( * ) Notice: Subject to any disclaimer, the term of this patent is extended or adjusted under 35 U.S.C. 154(b) by 360 days.

(21) Appl. No.: 17/672,755

(22) Filed: Feb. 16, 2022

(65) Prior Publication Data

US 2023/0260249 A1 Aug. 17, 2023

(51) Int. Cl.
G06K 9/00 (2022.01)
G06N 20/00 (2019.01)
G06V 10/44 (2022.01)
G06V 10/74 (2022.01)
G06V 10/774 (2022.01)

(52) U.S. Cl.
CPC ........... *G06V 10/761* (2022.01); *G06N 20/00* (2019.01); *G06V 10/443* (2022.01); *G06V 10/774* (2022.01)

(58) Field of Classification Search
CPC .................. G06V 40/197; G06V 10/255
See application file for complete search history.

(56) References Cited

U.S. PATENT DOCUMENTS

| | | | | |
|---|---|---|---|---|
| 10,832,062 B1 * | 11/2020 | Evans | ................ | G06F 18/2413 |
| 11,200,429 B1 * | 12/2021 | Evans | .................. | G06V 10/62 |
| 2017/0161919 A1 * | 6/2017 | Schroeder | ........ | G06V 30/19173 |
| 2017/0278135 A1 * | 9/2017 | Majumdar | ............. | G06V 40/10 |
| 2019/0005670 A1 * | 1/2019 | DeTone | .................. | G06T 7/593 |
| 2019/0228259 A1 * | 7/2019 | Pinheiro | ................ | G06N 3/045 |
| 2019/0362233 A1 * | 11/2019 | Aizawa | ................ | G06V 10/764 |
| 2020/0134375 A1 * | 4/2020 | Zhan | ........................ | G06V 10/82 |
| 2020/0309541 A1 * | 10/2020 | Lavy | .................... | G06V 20/588 |
| 2021/0224582 A1 * | 7/2021 | Afshar | ..................... | G06N 3/08 |

OTHER PUBLICATIONS

"Triplet Loss"; Wikipedia; version published on Sep. 29, 2021, and accessed on Nov. 9, 2021; retrieved from https://en.wikipedia.org/wiki/Triplet_loss; pp. 1-3.

* cited by examiner

*Primary Examiner* — Hadi Akhavannik

(74) *Attorney, Agent, or Firm* — Withrow & Terranova, PLLC

(57) ABSTRACT

A computer application may aim to identify first and second "matching" objects. The matching method cannot necessarily be based on how visually similar the two objects are to each other because two matching objects might be different and/or be visually different. Moreover, the images of the objects to be matched might not necessarily have metadata to assist in the matching. In some embodiments, a machine learning model may be trained using a set of digital images, each including two or more matching objects. Triplet loss training may be used, and each triplet may include: an image of a first object extracted from a first image, an image of an object that is visually similar to an image of a second object extracted from the first image, and an image of a third object extracted from a different image.

19 Claims, 13 Drawing Sheets

FIG. 12

SYSTEMS AND METHODS FOR TRAINING AND USING A MACHINE LEARNING MODEL FOR MATCHING OBJECTS

FIELD

The present application relates to machine learning, and, more particularly, to use of machine learning for object matching.

BACKGROUND

In some computer applications, a computer aims to identify a second object that has a visual appearance that complements the visual appearance of a first object. The first and second objects may be referred to as "matching". The first and second objects might or might not be visually similar, and they might or might not be different types of objects.

For example, in the context of e-commerce, a user may be browsing an online store or online marketplace, and the user's browser requests a product webpage for a striped shirt. The striped shirt is the first object. The computer identifies a black handbag (the second object) as a matching object that visually complements the appearance of the striped shirt. The computer modifies the product webpage for the striped shirt to incorporate content that recommends the black handbag, and then transmits the product webpage to the user's browser. When the user's browser displays the product webpage, it displays the striped shirt and also includes a recommendation for the black handbag. The striped shirt and black handbag are not visually similar (e.g. one is striped and the other is solid black), but they are identified by the computer as matching.

SUMMARY

Numerous technical challenges exist when implementing a computer application for matching objects. Examples of such technical challenges follow. First, the matching method cannot necessarily be based on how visually similar two objects are to each other because two matching objects might be different in terms of their physical form and/or be visually different (e.g. matching a striped shirt with a solid black handbag). Moreover, the images of the objects to be matched might not necessarily have metadata to assist in the matching. For example, the user may provide an image to the computer that is a picture of a striped shirt, and request a recommendation for a matching product. In the absence of metadata, the computer might not know that it is a striped shirt. Moreover, the matching may need to be executed in real-time or near real-time, e.g. in the time between receiving a request for web content and returning the web content, which in the context of online web browsing is a very small window.

In some embodiments, a machine learning (ML) model may be trained using a set of digital images in which each image has two or more different objects that are considered complementary, i.e. matching. For example, in the context of e-commerce, the set of digital images may originate from one or more photoshoots in which a stylist decides which products complement each other and captures digital images, e.g. for a product fashion catalog or digital magazine. For example, a stylist may determine that jeans, striped shirt, and a handbag go well together, and take a photograph of a model wearing jeans, a striped shirt, and holding a handbag.

In some embodiments, the ML model may be trained using triplet loss training. Post-training, in some embodiments, the ML model may be used to transform images of objects into feature vectors, and the computer may then determine a matching object as an object having a feature vector that is close to the feature vector of the object to be matched.

A triplet used for the triplet loss training may include an anchor (also sometimes called a query) comprising an image of a first object (e.g. a striped shirt) extracted from one of the digital images, a positive comprising an image of a different second object (e.g. a black handbag) also extracted from the same digital image, and a negative comprising an image of an object that is not extracted from the same digital image as the anchor and the positive (e.g. an image of a yoga mat bag extracted from a different image). In some embodiments, an object may be extracted from an image by using an object classification model to identify separate objects within an image and then create separate images for each object by cropping the image according to the boundaries established by the object classification.

However, a further technical problem exists with this training approach. Since the anchor and the positive are both images extracted from the same original image, they may include the same visual hints from the environment that are not related to the objects themselves, e.g. contextual elements such as the same lighting conditions, similar or same background pixels surrounding both objects, etc. This may negatively impact the performance of the ML model post-training, e.g. by reducing the generalizability of the model.

Therefore, in some embodiments, triplet loss training of the ML model is modified so that at least some of the triplets substitute the positive and/or the anchor for another image that is visually similar.

In one embodiment, there is provided a computer-implemented method. The method may include obtaining a first image of a first object extracted from an original image and obtaining a second image of a second object extracted from the original image. The method may also include using the second image to obtain a similar image. The similar image may be visually similar to the second image and might not be obtained from the original image. The method may also include training a machine learning model using a triplet. The triplet may include: the first image of the first object, the similar image, and a third image of a third object that is not extracted from the original image.

In some embodiments, the similar image is at least one of: an image obtained using a trained similarity machine learning model, an alternative image of the second object, or an image created by modifying the second image of the second object. In some embodiments, obtaining the image using the trained similarity machine learning model includes inputting the second image into the trained similarity machine learning model. In some embodiments, the trained similarity machine learning model may be trained to: obtain a vector representation of the second image, identify a corresponding image having a vector representation that is within a predetermined distance from the vector representation of the second image, and output an indication of the corresponding image, the corresponding image being the similar image.

In some embodiments, the third image of the third object may be extracted from a different image having a same source as the original image. In some such embodiments, the source may be a set of digital images that originate from a same image collection.

In some embodiments, the first image may be an anchor of the triplet, the similar image may be a positive of the triplet, and the third image may be a negative of the triplet. In other embodiments, the first image may be the positive of the triplet and the similar image may be the anchor of the triplet.

In some embodiments, the training of the model may include inputting each of the anchor, the positive, and the negative into the machine learning model to obtain vector representations of the anchor, the positive, and the negative. The training may also include computing a loss value based on a difference between a first distance and a second distance. The first distance may be based on a distance (e.g. Euclidean distance) between the vector representations of the anchor and positive. The second distance may be based on a distance (e.g. Euclidean distance) between the vector representations of the anchor and negative.

In some embodiments, the training may use a set of triplets that includes a subset of triplets for the original image. For each triplet of the subset of triplets, an anchor of the triplet may be the first image. As well, for each triplet of the subset of triplets: a positive of the triplet may be the similar image and a negative of the triplet may be another image different from the third image and that is not extracted from the original image; or the positive of the triplet may be another image different from the similar image and that is visually similar to the second image and the negative of the triplet may be the third image; or the positive of the triplet may be another image that is visually similar to the second image and the negative of the triplet may be another image that is not extracted from the original image.

In some embodiments, after the training the machine learning model to obtain the trained machine learning model, the method may further include receiving, from a device associated with a user, a request for web content. The web content may include an image of a first product. The method may also include determining one or more matching products based on distances between a vector representation of the image of the first product and vector representations of other products obtained using the trained machine learning model. The method may further include transmitting, for display on the user device, the web content including one or more images of the one or more matching products.

In some embodiments, if a vector representation of the image of the first product is not already stored, the method may further include a step of inputting the image of the first product into the trained machine learning model to obtain the vector representation of the image of the first product.

In some embodiments, the extracting the first object and the second object from the original image may include: identifying the first object and the second object in the original image; isolating a first region of the original image including the first object and a first contextual element; isolating a second region of the original image including the second object and a second contextual element; and storing the first region as the first image and the second region as the second image.

A system is also disclosed that is configured to perform the methods disclosed herein. For example, the system may include a memory to store images including an original image and at least one processor to carry out the method steps including obtaining images of the first object, the second object, and the similar object, and training the machine learning model.

In another embodiment, there is provided a computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIG. 12 illustrates a home page of an administrator, according to one embodiment.

DETAILED DESCRIPTION

For illustrative purposes, specific example embodiments will now be explained in greater detail below in conjunction with the figures.

Figure 1:
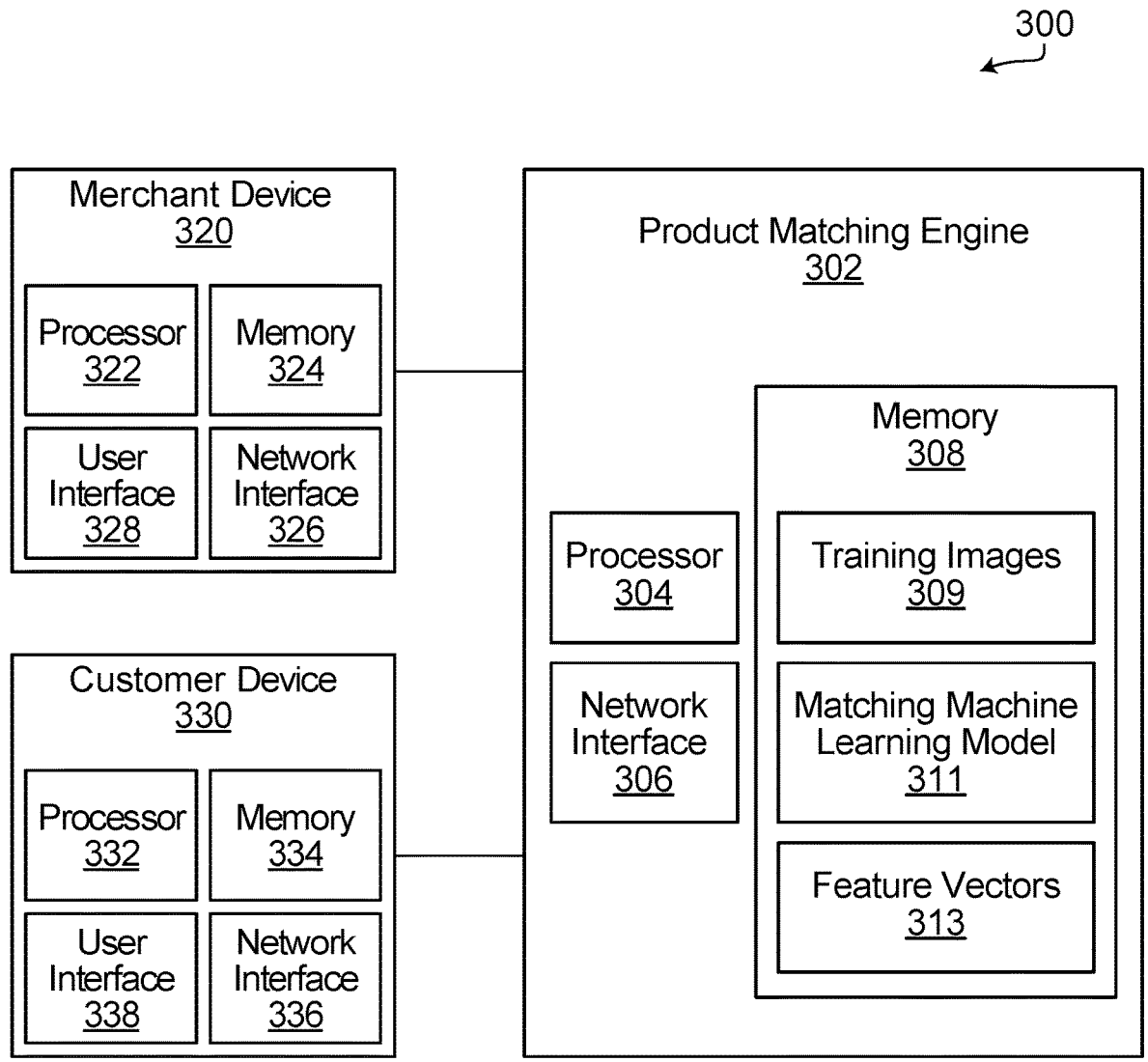
FIG. 1 illustrates a system for determining matching objects, according to one embodiment.

FIG. 1 illustrates a system 300 for determining matching objects, according to one embodiment.

In the system 300 and examples below, the objects will be referred to as products, and the system 300 and following examples will be explained in the context of e-commerce. However, as discussed later, the subject matter herein is not limited to e-commerce. E-commerce is simply used as a running example to assist the explanation.

The system 300 includes a product matching engine 302, at least one merchant device 320, and at least one customer device 330. Only a single merchant device 320 and a single customer device 330 are illustrated.

The product matching engine 302 of system 300 includes a processor 304, a network interface 306, and a memory 308. The processor 304 directly performs, or instructs the product matching engine 302 to perform, the operations described herein of product matching engine 302, e.g., operations such as obtaining a first image of a first object and a second image of a second object extracted from an original image, etc., as described in detail below. The processor 304 may be implemented by one or more general purpose processors that execute instructions stored in a memory (e.g. in memory 308) or stored in another computer-readable medium. The instructions, when executed, cause the processor 304 to directly perform, or instruct the product matching engine 302 to perform, the operations of the product matching engine 302 described herein. In other embodiments, the processor 304 may be implemented using dedicated circuitry, such as an application specific integrated circuit (ASIC), a graphics processing unit (GPU), or a programmed field programmable gate array (FPGA).

The network interface 306 is for communicating over a network, e.g. to communicate with the merchant device 320 and/or customer device 330 described below. The network interface 306 may be implemented as a network interface card (NIC), and/or a computer port (e.g. a physical outlet to which a plug or cable connects), and/or a network socket, etc., depending upon the implementation.

A single memory 308 is illustrated in FIG. 1, but in implementation the memory 308 may be distributed. The memory 308 includes training images 309, a matching machine learning model 311, and feature vectors 313, as described herein.

In some embodiments, the processor 304, memory 308, and/or network interface 306 may be located outside of the product matching engine 302.

A plurality of merchants may communicate with the product matching engine 302 over a network using merchant devices. For example, a merchant may use the merchant device 320 to communicate with product matching engine 302 in order to enable matching items to be displayed in the merchant's online store.

The merchant device 320 may be a mobile device (e.g. a smartphone, laptop, tablet), a desktop computer, etc., depending upon the implementation. The merchant device 320 includes a processor 322, a memory 324, a user interface 328, and a network interface 326. The processor 322 directly performs, or instructs the merchant device 320 to perform, the operations of the merchant device 320 described herein, e.g. enabling the merchant to configure, via the use of user interface 328, whether to display matching products on a product page in their online store. The processor 322 may be implemented by one or more general purpose processors that execute instructions stored in a memory (e.g. memory 324) or stored in another computer-readable medium. The instructions, when executed, cause the processor 322 to directly perform, or instruct the merchant device 320 to perform, the operations described herein. In other embodiments, the processor 322 may be implemented using dedicated circuitry, such as a programmed FPGA, a GPU, or an ASIC.

The network interface 336 is for communicating over a network, e.g. to communicate with the product matching engine 302. The structure of the network interface 336 will depend on how the merchant device 320 interfaces with the network. For example, if the merchant device 320 is a mobile phone, laptop, or tablet, the network interface 326 may comprise a transmitter/receiver with an antenna to send and receive wireless transmissions to/from the network. If the merchant device 320 is a personal computer connected to the network with a network cable, the network interface 326 may comprise a network interface card (NIC), and/or a computer port (e.g. a physical outlet to which a plug or cable connects), and/or a network socket, etc., depending upon the implementation.

The memory 324 is illustrated as single memory 324, but in implementation the memory 324 may be distributed.

The user interface 328 may be implemented as a display screen (which may be a touch screen), and/or a keyboard, and/or a mouse, etc., depending upon the implementation.

A plurality of customer devices may communicate with the product matching engine 302 over a network. For example, a customer may use customer device 330 to communicate with product matching engine 302, e.g. in order to receive a recommendation for a matching product.

The customer device 330 includes a processor 332, a memory 334, a network interface 336, and a user interface 338. The processor 332 directly performs, or instructs the customer device 330 to perform, the operations of the customer device 330 described herein, e.g. receiving, from the product matching engine 302, a transmission of web content including images of one or more products that match a product on a product page, which is then displayed via the user interface 338 of the customer device 330. The processor 332 may be implemented by one or more general purpose processors that execute instructions stored in a memory (e.g. memory 334) or stored in another computer-readable medium. The instructions, when executed, cause the processor 332 to directly perform, or instruct customer device 330 to perform, the customer device operations described herein. In other embodiments, the processor 332 may be implemented using dedicated circuitry, such as a programmed FPGA, a GPU, or an ASIC.

The user interface 338 may be implemented as a display screen (which may be a touch screen), and/or a keyboard, and/or a mouse, etc., depending upon the implementation. The network interface 336 is for communicating with the product matching engine 302 over the network. The structure of the network interface 336 will depend on how the customer device 330 interfaces with the network. For example, if the customer device 330 is a mobile phone, laptop, or tablet, the network interface 336 may comprise a transmitter/receiver with an antenna to send and receive wireless transmissions to/from the network. If the customer device 330 is a personal computer connected to the network with a network cable, the network interface 336 may comprise a NIC, and/or a computer port (e.g. a physical outlet to which a plug or cable connects), and/or a network socket, etc.

The memory 334 is illustrated as a single memory 334, but in implementation the memory 334 may be distributed.

In some embodiments, the product matching engine 302 is part of an e-commerce platform, such as an e-commerce platform as described later in relation to FIG. 13. However, this is not necessary. For example, the product matching engine 302 may be implemented as a stand-alone component or service that is external to an e-commerce platform. In some embodiments, the product matching engine 302 may be provided in the form of a downloadable application that is available for installation, e.g. in relation to a merchant and/or customer account. In some embodiments, some operations of the product matching engine 302 described herein could potentially be implemented in part on/by customer device 330 and/or merchant device 320.

Training Matching Machine Learning Model 311

The matching machine learning model 311 is trained using training images 309. An example will be explained below in the context of e-commerce, and more specifically using an example in which the matching machine learning model 311 is trained by processor 304 via triplet loss training and subsequently used for recommending matching products for sale. The training of the matching machine learning model 311 will be described in terms of steps below, which represent one possible embodiment.

Step 1:

In order to train the matching machine learning model 311, a set of digital images is first obtained in which each image in the set includes two or more products that are considered to match.

In one example, the set of digital images is obtained by downloading images from websites or social media applications that are known, or assumed, to have different products that complement each other, e.g. images from an online fashion catalog or fashion website.

In some instances, the set of digital images may ultimately originate from a manual process in which a stylist decides which products complement each other and captures digital images showing the products together, e.g. for use in an online product fashion catalog, website, or digital magazine.

In some embodiments, the set of digital images may be stored in the memory 308 of the product matching engine 302 as the training images 309 (or as part of the training images 309).

Step 2:

For each image of the set of digital images, products are identified, and an image of each identified product is extracted. The following are two example ways in which a product may be identified and extracted:

(1) A trained machine learning (ML) model may perform ML object detection to identify a product in an image and define a bounding box around the product. The image is then cropped to only include the pixels within the bounding box. The bounding box may include the product and contextual elements immediately adjacent to or interacting with the product, e.g. if the product is a shirt, and the image shows the shirt worn by a model, the bounding box may include a portion of the model's arms extending out of the sleeves of the shirt.

(2) A computer vision algorithm may identify a product in an image, e.g. by comparing sets of contiguous pixels in the image to images of known products to search for similarities. If a product is identified, the pixels associated with that identified product may be extracted from the image. A bounding box around the identified product (which may possibly also capture contextual elements) may be defined, like in example (1) above.

Both of the examples above may be implemented by an object classification model that identifies separate objects within an image and then creates separate images for each object by cropping the image according to the boundaries established by the object classification.

In either of these example methods of identifying and extracting product images, the set of digital images and the extracted product images may be saved as part of the training images 309 in the memory 308 of the product matching engine 302.

In a variation, the set of digital images may be scraped from websites or social media applications and only the extracted product images may be saved as part of the training images 309.

In any case, once the extracted product images are obtained and stored, an indication of the original image from which each product image was extracted may be recorded in the memory 308 of the product matching engine 302. For example, if three product images were extracted from a same original image, e.g. a striped t-shirt, jeans, and handbag, then it is stored in memory 308 that these three product images were extracted: from the same original image.

Figure 2:
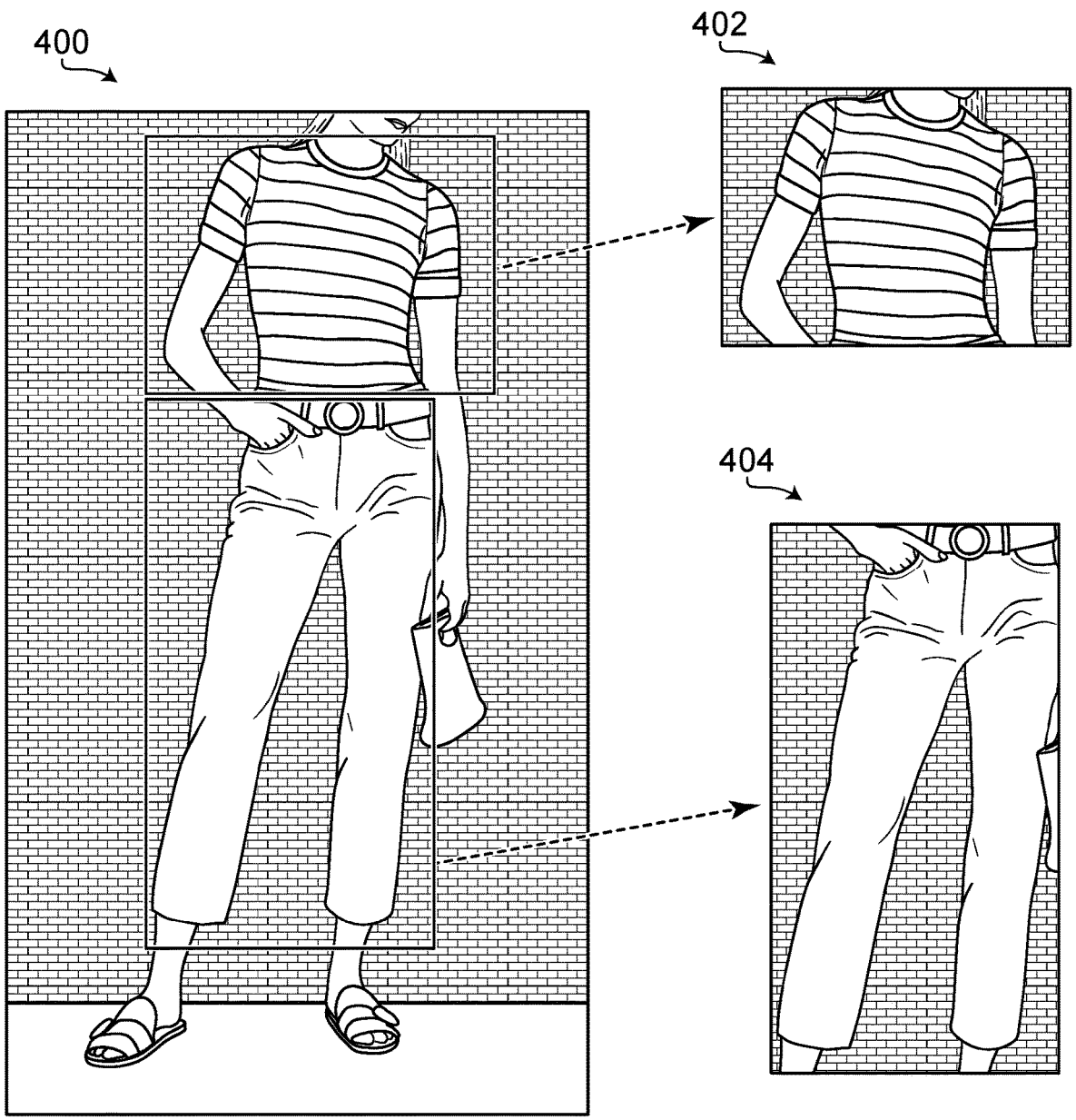
FIG. 2 illustrates an example of obtaining images of products from an original image, according to one embodiment.

FIG. 2 illustrates an example of obtaining images of products from an original image, according to one embodiment. The original image 400 is an image of a model posing in front of a brick wall wearing a striped t-shirt, jeans, and carrying a handbag. In this example, a trained ML model may be used to detect at least the striped t-shirt and jeans present in the original image 400. In FIG. 2, bounding boxes are shown on top of the original image 400 to indicate the boundaries of the two identified products. The original image 400 may then be cropped in order to generate separate images of the identified striped t-shirt 402 and the jeans 404. These images of the identified products may then be stored as part of training images 309 in the memory 308 of the product matching engine 302. Note that the cropped images include contextual elements immediately surrounding and/or interacting with the product, e.g. image 402 is not just the t-shirt, but includes a portion of the arms, neck, and brick background.

Other products, such as the handbag and the belt in the original image 400 may also be detected by the trained ML model. However, only the detection of the striped t-shirt and the jeans are shown for ease of explanation.

Step 3:

Following the identification and extraction of the product images from an original image, the product matching engine 302 may then select an image of a first product. An image of a different second product is also selected, with the condition that the image of the first product and the image of the second product were extracted from a same original image. The image of the second product is then used to obtain one or more similar images. A similar image is an image determined to be similar (e.g. visually similar) to the image of the second product. Three example ways in which a similar image may be obtained are as follows:

(1) The product matching engine 302 may use a trained ML model to select, from a database, a similar image given the image of the second product as an input. The ML model may be referred to as a "similarity ML model" because it outputs a similar image to an input image. In some embodiments, the database from which the similar image is selected may be stored in the memory 308 of the product matching engine 302 and may include some or all of the training images 309 used to train the matching machine learning model 311.

(2) The product matching engine 302 may obtain an alternative image of the second product originating from another source, and that alternative image may be used as the similar image. For example, if the image of the second product is known to be a pair of jeans, then another image of those jeans (e.g. taken from a different angle) may be used as the similar image. The alternative image may potentially be downloaded from a website selling the second product, or from a webpage, video, or web content reviewing the second product (e.g. a picture of the second product taken by a person reviewing the second product), etc.

(3) A similar image may be created by modifying the image of the second product, e.g. changing the intensity of one or more pixel values of the image of the second product and/or randomly adding some noise to the image of the second product.

The product matching engine 302 may then form a triplet by selecting: an anchor comprising the image of the first product, a positive comprising one of the similar images, and a negative comprising an image of a product that is not extracted from the same original image as the anchor. Three example ways in which the negative may be determined is as follows:

(1) A negative may be randomly selected as an image of another product extracted from a different image in the set of digital images.

(2) A negative may be selected as an image of a product from the internet or from a social media application.

(3) A trained ML model may be used to select, from a database, an image that is dissimilar given the image of the first product as an input.

In any one, some or all of the three examples above, the negative image may be limited to being a same or similar product type (category) as the positive, e.g. if the positive is a pair of jeans, then the negative must also be some sort of pants or bottoms. In some embodiments, if the negative and the positive depict the same or similar product type, then there may possibly be a limitation around which negative can be selected to ensure the negative is different enough from the positive (e.g. in terms of a distance function between the two images).

In some embodiments, the negative may be an image of a product extracted from a different image than the image including the anchor. However, the image including the negative and the image including the anchor may originate from the same source (e.g., a same electronic catalog/collection). Using a negative from the same source might potentially also help prevent the model from product matching by "learning" features relating to contextual elements of the images. Contextual elements of an image may include: features of the background of the image, such as a piece of furniture a model is sitting on; and/or lighting, such as a level of saturation of the colors of an image; and/or the appearance of the model, such as skin tone or hair color; and/or objects adjacent to or interacting with the product, e.g. a person's hand holding the handbag, a person's neck above the collar of the striped t-shirt; etc.

In some embodiments, the negative is selected as an image of a product that is different from the anchor product to try to ensure a sufficiently large distance between the anchor and the negative (e.g. to try to ensure a sufficiently large distance between the feature vector corresponding to the anchor and the feature vector corresponding to the negative).

Figure 3:
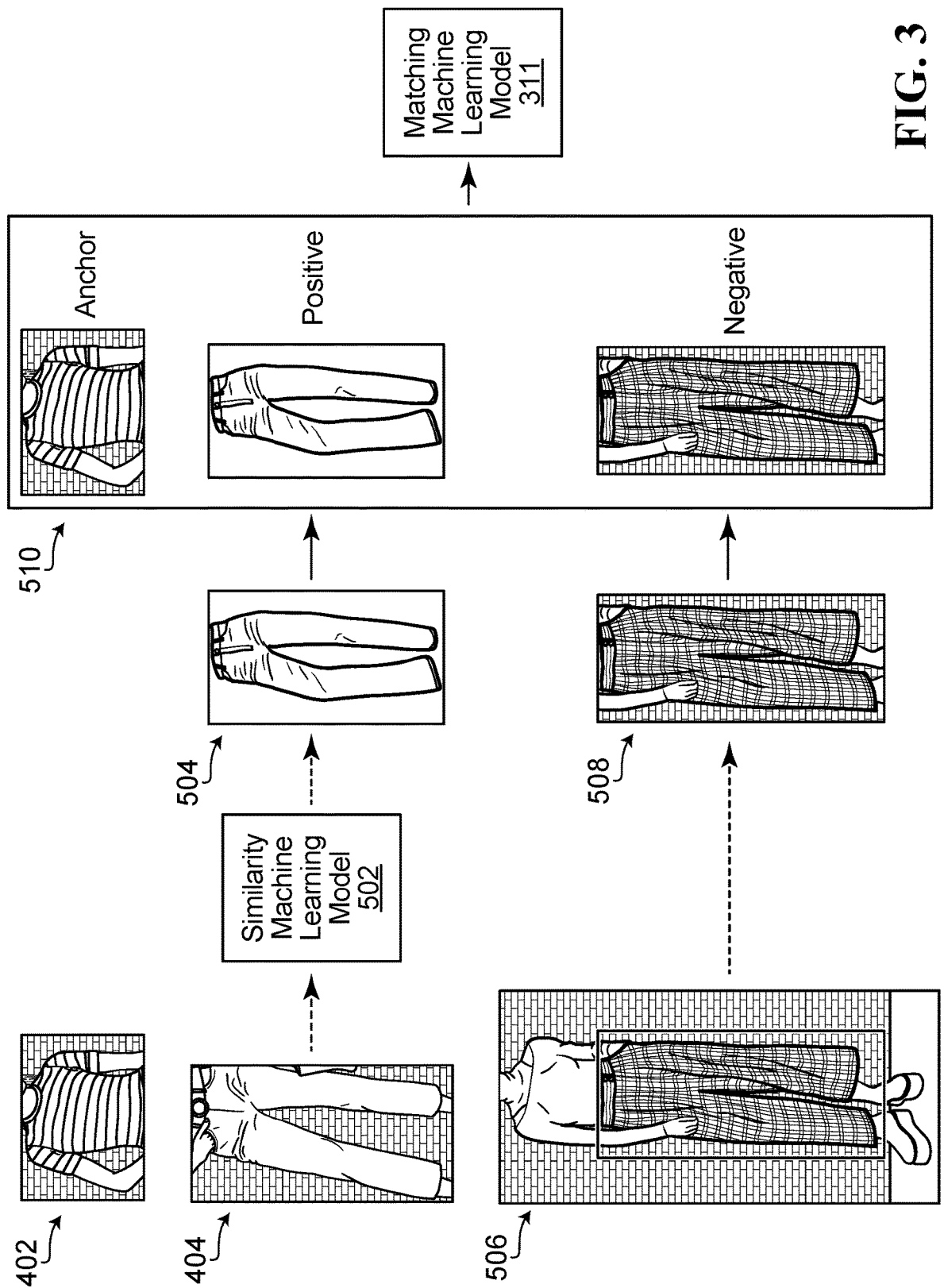
FIG. 3 illustrates an example of creating a triplet, according to one embodiment.

FIG. 3 illustrates an example of creating a triplet, according to one embodiment. In this example, the image of the striped t-shirt 402 and the image of the jeans 404 may be selected as the images of the first product and the second product, respectively, as both images originate from the same original image 400 shown in FIG. 2. The image of the striped t-shirt 402 may be assigned to be the anchor of the triplet 510.

The image of the jeans 404 may be input into a similarity machine learning model 502 in order to obtain an image of a product that is visually similar to the image of the jeans 404 extracted from the original image 400. The similarity machine learning model 502 may, for example, output a different image of jeans, such as an image of wide-leg jeans 504. The image of the wide-leg jeans 504 may be assigned to be the positive of the triplet 510.

The product matching engine 302 may obtain a different image 506 that may originate from the same source (e.g. same image collection) as the original image 400, but includes images of different products. Both the original image 400 and the different image 506 may be from a same online catalog for a same store. As such, the original image 400 and the different image 506 may share contextual elements, such as the brick wall in the background of both images and the lighting of the images. A detected product in the different image 506 is a pair of plaid pants, and the different image 506 may be cropped in order to extract an image of the plaid pants 508. In an embodiment, an image of the plaid pants 508 may be extracted and saved as part of the training images 309 in the memory 308 of the product matching engine 302, e.g. prior to training. The image of the plaid pants 508 may be assigned to be the negative of the triplet 510. Note that in this example the negative (plaid pants) is the same general product type/category as the positive (jeans).

The generated triplet 510 may therefore include: the image of the striped t-shirt 402 extracted from the original image 400 as the anchor, the image of the wide-leg jeans 504 that are similar to the jeans from the original image 400 as the positive, and the image of the plaid pants 508 extracted from the different image 506 as the negative. The triplet 510 may then be used as one input to the matching machine learning model 311 as part of training the matching machine learning model 311, e.g. using triplet loss training.

In some embodiments, the image of the first product (image 402) may be used to obtain a similar image, and the similar image may be used as the anchor of the triplet instead of using the image of the first product as the anchor. For example, instead of using image 402 as the anchor, image 402 may be input into the similarity machine learning model 502, and the image output from the similarity machine learning model 502 used as the anchor. This may be done instead of using a similar image for the positive (e.g. image 404 may be used as the positive), or it may be done in addition to using a similar image for the positive (e.g. image 504 is still also used as the positive). In some embodiments, the negative may be a similar image, e.g. instead of using image 508 as the negative, image 508 may be input into similarity machine learning model 502, and the output of similarity machine learning model 502 may be used as the negative. In some embodiments, a trained machine learning model may accept the positive as an input and output a suitable negative, e.g. a negative that is different from the positive, but not too different (e.g. still the same product type/category as the positive).

Step 4:

Step 3 may be repeated for the anchor for different positives and/or negatives to obtain one or more additional triplets, e.g. by keeping the same anchor but selecting a different similar image and/or a different image for the negative.

As an example, the image of the striped t-shirt 402 may be used as an anchor in the creation of several additional triplets. However, in some of the additional triplets, the image of the wide-leg jeans 504 might not be used as the positive. Instead, triplets may be created using different positive images that are visually similar to the image of the jeans 404. These different positive images may also be outputs of the similarity machine learning model 502. In some of the additional triplets having a different positive, the image of the plaid pants 508 may be assigned to be the negative. In some of the other additional triplets having a different positive, an image different to the image of the plaid pants 508 may be used as the negative.

In some other of the additional triplets, the image of the plaid pants 508 might not be used as the negative. In an example, different negative images may be selected for use in the triplets. For instance, a different negative may be an image of a knee-length polka-dotted skirt or a pair of pink pants that have also been photographed as part of the same online catalog. In some of the additional triplets having a different negative, the image of the wide-leg jeans 504 may be used as the positive. In some of the other additional triplets having a different negative, an image different to the image of the wide-leg jeans 504 may be used as the positive.

Step 5:

Step 3 (and optionally Step 4) may then be repeated for each other product image extracted from the same original image. That is, a different image of a product extracted from the original image may be assigned as the anchor.

In an example, Steps 3 and 4 may initially be performed using the image of the striped t-shirt 402 as the anchor (as illustrated), and then repeated using the image of the jeans 404 as the anchor, and then repeated using the image of the handbag as the anchor.

For instance, images of products extracted from the original image 400 include the image of the striped t-shirt 402 and the image of the jeans 404. In Step 5, the image of the jeans 404 may be assigned as the anchor instead of the image of the striped t-shirt 402. Subsequently, the image of the striped t-shirt 402 may be input to the similarity machine learning model 502 to determine a positive to be used as part of the triplet. An image of a different shirt found in the same online catalog be used as a negative of the triplet.

Step 6:

Steps 3 to 5 may then be repeated for each other image in the set of digital images.

The result is a large number of triplets, which may possibly be partitioned into different groups, referred to as "batches".

Step 7:

A batch of triplets may then be selected. If the triplets are not separated into batches, then all the triplets may be selected. For each triplet, the anchor, the positive, and the negative are each separately input into the matching machine learning model 311. In some embodiments, the matching machine learning model 311 is implemented by a neural network (NN) that converts the input image into a vector of numerical values, referred to as a feature vector. The NN has weights between nodes, which impact the numerical values of the feature vector. The feature vector corresponding to each image of each triplet may be stored in the memory 308 of the product matching engine 302 as part of the feature vectors 313.

A loss value is then computed using the three feature vectors of the triplet.

In some implementations, the loss value may be computed using a triplet loss computation that is based on distance between feature vectors. For example, the distance between the anchor feature vector and the positive feature vector may be computed, the distance between the anchor feature vector and the negative feature vector may be computed, and the difference between the two computed distances may be considered the loss. The distance between two feature vectors may be computed as a Euclidean distance, but this is not necessary. For example, the distance computation may instead be based on cosine distance or Manhattan distance. More generally, in some embodiments, any distance function or distance metric may be used to compute the distance between two feature vectors. A non-limiting list of examples of distance functions or distance metrics include Euclidean distance, cosine distance, and Manhattan distance.

One example formula for computing a loss value for a triplet may be the following (or may be based on the following): $\|f(A)-f(P)\|^2-\|f(A)-f(N)\|^2$. In this formula, f(A) is the feature vector output by the NN when the anchor is the input to the NN, f(P) is the feature vector output by the NN when the positive is the input to the NN, and f(N) is the feature vector output by the NN when the negative is input to the NN. The notation "||" refers to the norm of the vector. In this formula, the distance between the anchor feature vector f(A) and the positive feature vector f(P) is computed, the distance between the anchor feature vector f(A) and the negative feature vector f(N) is computed, and the difference between the two computed distances may be considered the loss.

Depending upon the implementation, different formulas or techniques may be used for computing a loss value for the triplet. The formula/method above is just an example. In some implementations a margin loss value may be computed as the loss value for a triplet. In other implementations, a pairwise ranking loss value may be computed as the loss value for a triplet. Pairwise ranking loss may take anchor-positive pairs from different images and assume all positives are negatives to the anchors they are not paired with.

The loss may be computed for each triplet in the batch using any of the methods described above. Then, in some embodiments, the computed loss values may be averaged to obtain an average loss value. Backpropagation may then be performed on the NN using the average loss value to update the weights between the nodes. The process may repeat using the same or one or more additional batches of triplets until training is complete, e.g. until the matching machine learning model 311 represented by the NN converges (loss value stops decreasing).

Figure 4:
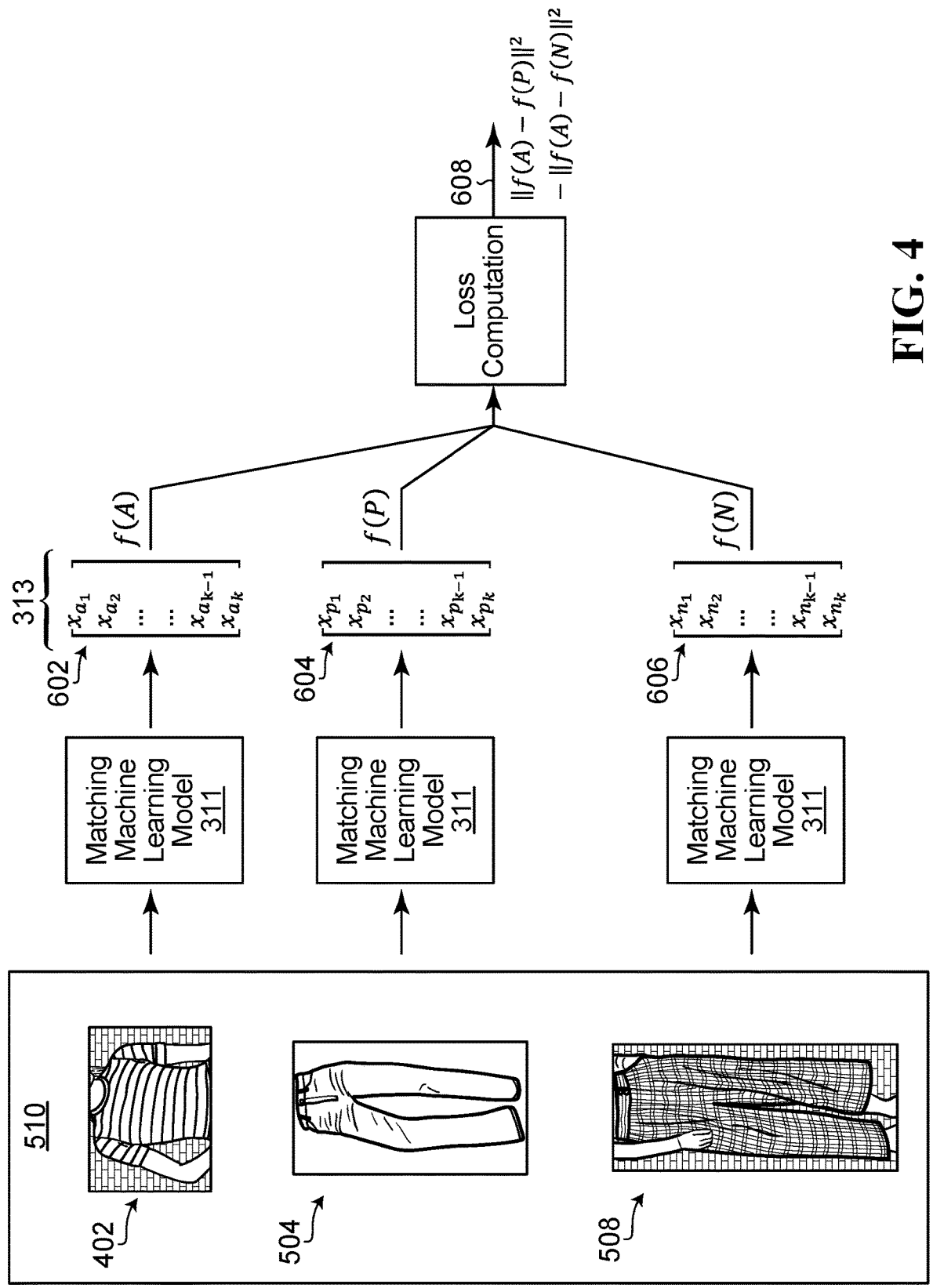
FIG. 4 illustrates an example of using a machine learning model to determine a triplet loss value, according to one embodiment.

FIG. 4 illustrates an example of computing a triplet loss value, according to one embodiment. The triplet may consist of the images of the triplet 510 created in FIG. 3, in which the anchor is the image of the striped t-shirt 402, the positive is the image of the wide-leg jeans 504, and the negative is the image of the plaid pants 508. All three images of the triplet may be input into the same NN, which here is the matching machine learning model 311 of the product matching engine 302. The matching machine learning model 311 may then output vector representations of the anchor 602, positive 604, and negative 606. These feature vectors may be stored in the memory 308 as part of the feature vectors 313. Following the determination of the feature vectors of the triplet 602, 604, and 606, a triplet loss 608 may be calculated using a triplet loss equation, e.g. as previously described. This is an example of the calculation of a triplet loss of a single triplet among a set of triplets. A respective triplet loss may be calculated for each triplet of a batch of triplets, and then the triplet losses (e.g. an average of the losses) may be used to modify the weights assigned between the nodes of the matching machine learning model 311.

In some embodiments, the images of a triplet may be input to the matching machine learning model 311 as pixel representations of the images. In another embodiment, metadata associated with an image may be input to the matching machine learning model 311 instead of, or in addition to, the pixel representation of the image. As an example, metadata for an image may include a label assigned to the image of the product, e.g. a label indicating that image 402 is an image of a t-shirt.

In some embodiments, the similarity machine learning model 502 may also be trained using triplet loss training. In such a case, an anchor of a triplet may be a product image. A positive of the triplet may be an alternative image of the product or a modified version of the product image. For instance, the positive may be an image of a same product from a verified purchase review of the product. A negative of the triplet may be an image of a different product. In other embodiments, the similarity machine learning model 502 may be differently trained.

In some embodiments, more than one matching machine learning model 311 may be stored in the product matching engine 302. Different matching machine learning models may be trained differently based on style or seasonality. For instance, one matching machine learning model may be trained for customers who prefer "timeless" clothing and is only trained on images of products that are classic and that are not subject to trends. Conversely, another matching machine learning model may be trained for customers who may prefer to take fashion risks and keep up with the latest trends. This "trendy" matching machine learning model may require re-training seasonally in order to prevent the model from recommending products that might no longer be trendy, and to incorporate new products that have recently become trendy.

In some embodiments, a merchant may select which matching machine learning model 311 they may prefer to use in their store. In another embodiment, the product matching engine 302 may determine which matching machine learning model 311 to use to display matching products to a customer. If the customer has an established customer profile with the online store or e-commerce platform, the product matching engine 302 may be able to access their purchase history and make a determination as to the customer's style preferences, and from that decide which matching machine learning model to use for that customer.

As another example, a plurality of matching machine learning models may be trained based on customers in different climates. For instance, one matching machine learning model may be trained for customers living in year-round warm climates and another for customers who experience cold winters. The training of the model for customers living in year-round warm climates may include several additional triplets in which the negative is an image of warm clothing, such as heavy sweaters or winter coats, such that the trained model might not recommend clothing that is not appropriate for a particular climate. The product matching engine 302 may determine which matching machine learning model 311 to use to recommend matching products to a particular customer based on a location of a customer's customer device 330. For example, the IP address of the customer device 330 may be used to infer the customer's location. As another example, the customer's geolocation may be approximated based on GPS location or location of the network that the customer device 330 is connected to. This information may be provided to the product matching engine 302, and defined/pre-determined knowledge of the climate associated with the location may be used to determine the appropriate matching machine learning model 311.

Possible technical benefits of some embodiments of the training method described herein (e.g. Steps 1 to 7 above) are as follows. As explained earlier, if the anchor and the positive are both images extracted from the same original image, they may include the same visual hints from the environment that are not related to the objects themselves, e.g. contextual elements such as the same lighting conditions, similar or same background pixels surrounding both objects, etc. This may negatively impact the performance of the matching machine learning model post-training, e.g. by reducing the generalizability of the model. However, in some embodiments of the training method described herein (e.g. Steps 1 to 7 above), by using the image of the second product (e.g. image 404) to obtain a similar image (e.g. to obtain image 504), and then using the similar image as the positive, the machine learning model 311 may be able to better generalize/perform better post-training. This is because the contextual elements common between different products extracted from the same original image may be reduced or eliminated by using a positive that is not extracted from the same original image as the anchor. For example, the similar image 504 does not have the brick background and may have different lighting compared to anchor image 402, and therefore the brick and lighting does not influence as much the determination of what causes two products to match. For example, the trained machine learning model 311 is less likely to determine that two products match just because they both happen to have bricks in the background surrounding the product. Note that instead of (or in addition to) using a similar image as a positive, a similar image may be used for the anchor, e.g. the image 402 is input into similarity machine learning model 502 to determine a similar image, and that similar image is used as the anchor.

Another possible benefit of some embodiments of the training method described herein (e.g. Steps 1 to 7 above) is reduced chance of overfitting because a large collection of triples can be generated using images for which the positive and anchor do not originate from a same original image. For example, as explained in Step 4 above, different positives and/or negatives may be selected for a given anchor to obtain additional triplets, and each of the positives and/or negatives may be obtained from different images. Steps 3 to 5 may be repeated to obtain a large set of triplets allowing for many data points. The use of similar images (e.g. by utilizing similarity machine learning model 502) may provide data augmentation that helps reduce or eliminate overfitting.

Another possible benefit of some embodiments of the training method described herein (e.g. Steps 1 to 7 above) is that contextual elements may still be included in the images of the products, thereby maintaining the benefits associated with using such contextual elements to assist with the training. An alternative approach of tightly cropping product images to minimize visual elements around the product (e.g. generating image 402 to only encompass the pixels of the striped shirt and not the arms, neck, and background bricks) may help mitigate the problem of contextual elements negatively influencing the performance/generalizability of the machine learning model post training, but the useful information associated with the contextual elements is lost, which may cause the machine learning model to ultimately still perform poorly. In some embodiments of the training method described herein (e.g. Steps 1 to 7 above), the product images may still include contextual elements such as arms, necks, hands, etc., which may help the machine learning model perform better. The problem of the contextual elements providing similar visual hints from the environment that are not related to the objects themselves is mitigated by using a similar image (e.g. image 504 instead of image 404) for the positive and/or anchor.

Another possible benefit of some embodiments of the training method described herein (e.g. Steps 1 to 7 above) is more scalability compared to manual selection of positives and/or negatives. Manual selection would require a large manual effort and would be influenced by the personal style of the person performing the manual selection. In some embodiments of the training method described herein (e.g. Steps 1 to 7 above), a large selection of triplets is automatically generated by the processor using a catalog of product images and other product images deemed to be similar (e.g. the output of similarity machine learning model 502). As well, the use of obtaining a positive image that is similar (e.g. by way of a similarity machine learning model) may enable the positive to be selected from a larger image set, including images that might not be part of a particular merchant's product images.

Another possible benefit of some embodiments of the training method described herein (e.g. Steps 1 to 7 above) is that it may obtain images of matching items from the set of digital images on which it trains, rather than needing to obtain matching items from a different secondary source.

Use of the Trained Machine Learning Model 311 to Determine Matching Products

Following the training of the matching machine learning model 311, the trained matching machine learning model 311 may then be used to determine products that are complementary.

In one embodiment, in order to prepare the trained matching machine learning model 311 for use, each product image of a collection of product images is input into the trained matching machine learning model 311 to obtain a respective feature vector. The obtained feature vectors may be stored as the feature vectors 313 in the memory 308 of the product matching engine 302. The feature vectors that are "closest" to each other (e.g. have a distance from each other, such as a Euclidean distance, that is below a certain threshold) are considered to match. The matches may be ranked, e.g. based on distance (such as Euclidean distance). For example, the top match for a target product is a product having a feature vector that is closest to (e.g. smallest distance from) the feature vector of the target product.

During operation, the product matching engine 302 obtains an image of a first product for which one or more matching second products are to be identified. If the first product is part of the product image collection already converted into feature vectors 313, then the feature vector of the first product already exists. Otherwise, the image of the first product is input into the trained matching machine learning model 311 to obtain a feature vector. The product matching engine 302 then identifies the matching one or more second products as the one or more second products having a feature vector close to the feature vector of the first product.

For instance, the product matching engine 302 may obtain an image of the striped t-shirt 402 found in the original image 400. As this image is one of the training images 309 stored in the memory 308 of the product matching engine 302, the corresponding vector representation of the image of the striped t-shirt may already be stored in the feature vectors 313. The product matching engine 302 may then determine which of the other of the feature vectors 313 are closest to the vector representation of the image of the striped t-shirt.

In some embodiments, the trained machine learning model 311 is used to generate, offline, feature vectors for a large collection of images. The feature vectors are then stored in memory for subsequent use. Subsequently, during web browsing, when a product recommendation needs to be made, the recommendation may be made in real-time or near real-time using the stored feature vectors. For example, a user may be browsing an online store, and the user's browser requests a product webpage for a striped shirt. In the time between when the webpage is requested and when the content of the webpage is sent to the user, the feature vector corresponding to the striped shirt and the feature vectors stored for the other products may be used to quickly determine which products match the striped shirt (e.g. based on how close the feature vectors of those other products are to the feature vector of the striped shirt). The product webpage for the striped shirt may then be modified to incorporate content that recommends the other product(s), and the modified product webpage is transmitted to the user's browser. The machine learning model 311 is trained in advance of the web browsing, and it might only need to be used to potentially convert the image of the striped shirt into a feature vector, if not already done in advance offline. This may allow for the recommendation to be made in real-time or near real-time in the context of web browsing in which there is a small window of time between when a page of content is requested and when the page needs to be sent to the user's browser.

Example User Interfaces

In some embodiments, the merchant may be able to configure the display of matching products for one or more products for sale in the merchant's online store. The matching products may be identified using the trained matching machine learning model 311.

Depending upon the implementation, there may be several possible interfaces that may allow a merchant to select whether or not to display matching products and/or which matching products to display to a customer browsing their online store.

Figure 5:
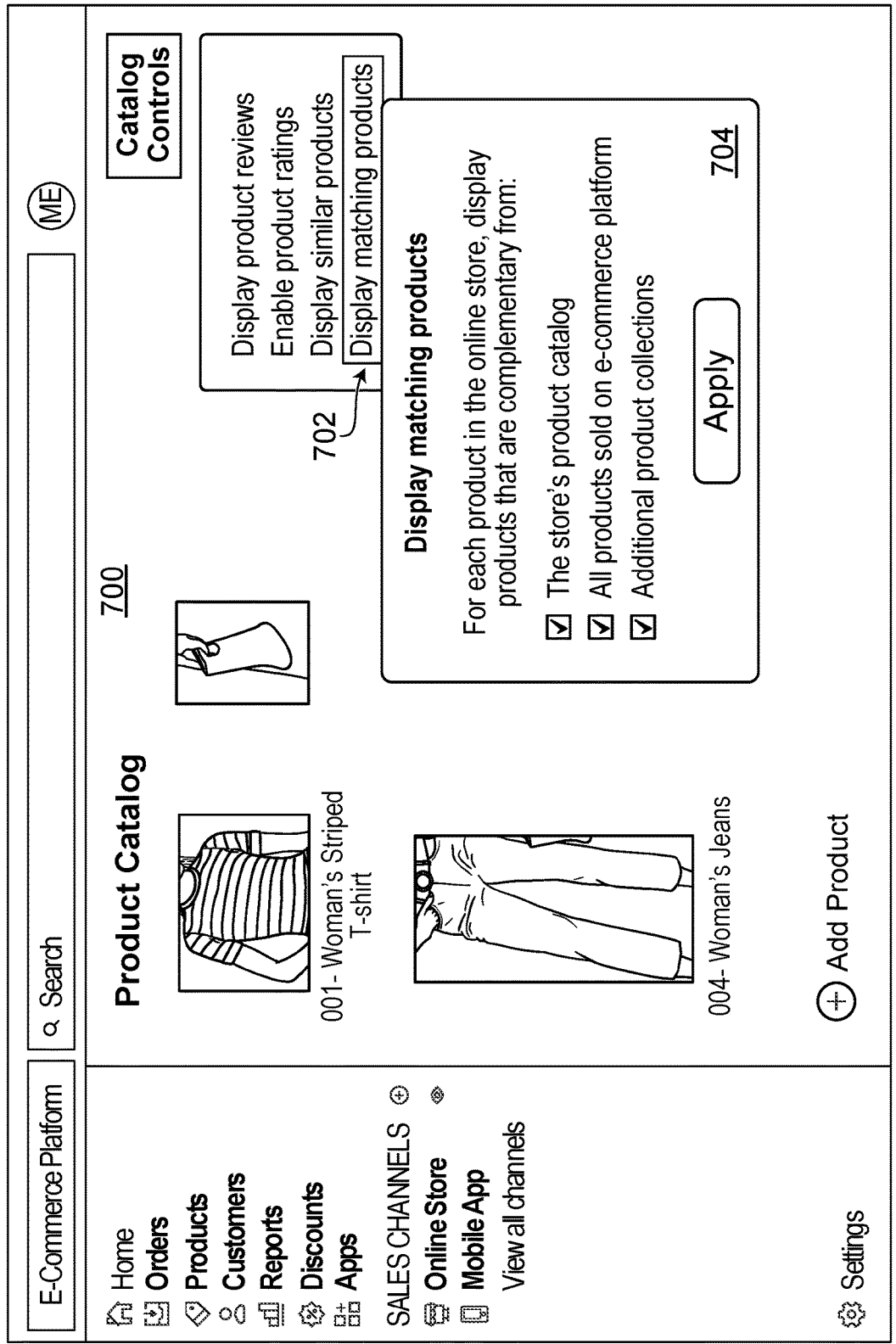
FIGS. 5 to 7 illustrate examples user interfaces provided to the merchant to configure the display of products that match a product in an online store, according to various embodiments.
Figure 6:
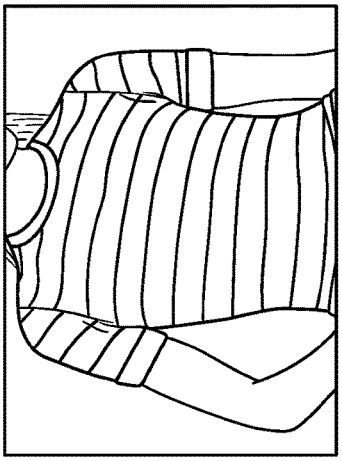
Figure 7:
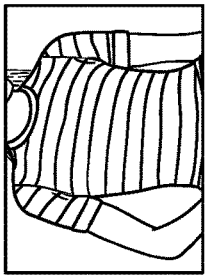

FIGS. 5 to 7 illustrate examples of user interfaces that may be provided to the merchant to configure the display of products that match a product for sale in an online store, according to various embodiments. The interfaces may be provided to the merchant via the UI 328 of merchant device 320 associated with the merchant. In FIGS. 5 to 7, the user interfaces are provided as part of a merchant administrator webpage used to view and configure settings in an e-commerce platform. However, this is merely an example. The ability to configure the display of matching products may be provided to the merchant device 320 through the product matching engine 302 in another manner, such as via a web plug-in or as part of a downloaded application, and there might not even be an e-commerce platform.

In FIG. 5, a user interface 700 is provided to the merchant via the display of the merchant device 320. The user interface 700 displays the product catalog of a merchant's online store, and includes a button having the text: "Catalog Controls". When the "Catalog Controls" button is selected, web content may be provided including a drop-down list of options for configuring various aspects for display on the product pages for all products in the merchant's catalog. In FIG. 5, the drop-down list includes configuring: the display of product reviews on each product page; the enabling of product ratings for each product; the display of similar products on each product page, that for example, are determined through the use of the similarity machine learning model 502; and, the display of matching products.

In FIG. 5, the option: "Display matching products" 702 has been selected from the drop-down list. The selection of this option results in the product matching engine 302 providing additional web content 704 for display on the merchant device 320. The additional web content 704 prompts the merchant using the merchant device 320 to select the source of the matching products to be displayed for the products listed in the product catalog. In web content 704, the options presented include displaying products originating from one or more of: the product catalog of the merchant's store; all the products sold on the e-commerce platform (e.g. including products sold by other merchants on the e-commerce platform); and products in additional product collections. The merchant may interact with web content 704 using the merchant device 320 to select the desired origin/source of the matching products.

When the merchant selects the "Apply" button, an indication of the merchant's selection may be provided to the product matching engine 302. If not already done, the trained machine learning model 311 may be used to convert each product image of the merchant's product catalog to a respective feature vector. The processor 304 of the product matching engine 302 may then determine the closest feature vectors associated with other products of the selected source for each feature vector corresponding to each of the product images of the merchant's product catalog. The images associated with the closest feature vectors may then be provided as the matching products for each of the products in the merchant's product catalog.

If, for example, only the option: "the store's product catalog" is selected by the merchant in web content 704, the processor 304 of the product matching engine 302 may then only use feature vectors corresponding to products in the merchant's product catalog when determining the closest feature vectors for each product image.

The user interface 700 of FIG. 5 is only one example of configuring the display of matching products for all products in a merchant's online store. The interface is not limited to either the appearance or functionality of the example user interface 700.

The web content 704 is also only one example of web content that may be used to configure the display of matching products for all products in a merchant's online store. In some embodiments, the web content may prompt the user to select the products in the product catalog for which to enable the display of matching products. The web content may include check boxes beside each product image in the catalog, and selecting the checkbox may indicate to the product matching engine 302 that it is to determine one or more matching products for the selected product.

In some embodiments, the web content 704 may additionally or instead allow the merchant to select rules for determining which matching product(s) to display in relation to a product in the merchant's product catalog. For instance, the web content may allow a merchant to indicate a category/type of product to include or omit from the recommended matching products. As an example, a merchant may opt not to include products categorized as "jewelry" as recommended matching products. This type of rule may also be more granular and particular to a product category/type of the item in the product catalog. For instance, a rule may include: "For products in the category of "tops" do not recommend products in the category of "shoes" as matching products". The selected rules may be provided to the product matching engine 302 and used by the processor 304 to determine which of the feature vectors 313 associated with product images to use or omit when determining the closest match to each product in the merchant's product catalog.

In some embodiments in which there are multiple trained matching machine learning models, the web content 704 may provide the merchant with the ability to select which of the models to use for determining matching products for each product in the merchant's product catalog.

FIG. 6 illustrates another example user interface 800 for configuring a product page by a merchant via merchant device 320. The user interface 800 allows a merchant to configure aspects of the product page. In the illustrated example, on the interface 800 of the product page for the striped t-shirt, the option to "Display matching products" has been toggled to "ON" 802. This provides an indication to the processor 304 to enable the display of images of products that are determined to match the striped t-shirt by the matching machine learning model 311.

The web content 804 may enable the merchant using the merchant device 320 to select the source of the matching products to be displayed for the product on the product page. In web content 804, the options presented may include displaying products originating from one or more of: the product catalog of the merchant's store; all of the products sold on the e-commerce platform; and additional product collections. The merchant may interact with web content 804 using the merchant device 320 to select the desired source of the matching products. In FIG. 6, the only option selected by the merchant in web content 804 is to display matching products from the store's own product catalog.

When the merchant selects the "Apply" button, an indication of the merchant's selection may be provided to the product matching engine 302. As only matching products in the merchant's product catalog are to be displayed, the product matching engine 302 may filter out feature vectors associated with images of products that are not sold in the merchant's store before determining the closest feature vectors to the product image of the striped t-shirt. The images associated with the closest feature vectors may then be provided as the matching products to be displayed on the product page.

The user interface 800 of FIG. 6 is only one example of configuring the display of matching products for a product on a product page of a merchant's online store. The interface is not limited to either the appearance or functionality of the example user interface 800. For instance, check boxes or a drop-drop down menu may be used to select an aspect for configuration instead of toggles. Different and/or additional aspects may be configured through the use of a user interface.

The web content 804 of FIG. 6 is also only one example of web content allowing configuration of matching products to display. The web content may also or alternatively allow the merchant to configure rules for determining matching products, or to allow a merchant to select a particular matching machine learning model 311, as described earlier in relation to the web content 704 in FIG. 5.

FIG. 7 illustrates a different example user interface 900 for configuring a product page by a merchant via a merchant device 320. User interface 900 displays an interface that allows a merchant to select which matching product to display on a product page to a customer browsing an online store. In FIG. 7, the user interface 900 prompts the merchant to select which of the matching products, as determined by the product matching engine 311, to display on the product page for the striped t-shirt. The interface includes images of matching products such as "Jeans", "Wide-leg Jeans", "White Jeans", and "Belt". Beside each of the images is a checkbox. Here, the merchant has selected to configure the "Jeans", "Wide-leg Jeans", and "Belt" as matching products.

When the merchant clicks on the "Apply" button after selecting the desired matching products to display, the product matching engine 302 may receive an indication of the products to display to the customer via the customer device 330.

In some embodiments, the user interface 900 of FIG. 7 may be provided to the display of the merchant device 320 subsequent to the merchant's selection of the "Apply" button on the interface 800 of FIG. 6. In other embodiments, the user interface 900 of FIG. 7 may be accessed differently, such as through a menu. In other embodiments, the user interface 900 of FIG. 7 may be provided to the display of the merchant device 320 subsequent to the merchant's selection of the "Apply" button on the interface 700 of FIG. 5, and the merchant device 320 may be presented with specific, configurable options for each product in the product catalog.

In an example, the user interface 900 of FIG. 7 may be provided to the display of the merchant device 320 subsequent to the merchant's selection of the "Apply" button on the interface 800 of FIG. 6. In this scenario, each of the products: "Jeans", "Wide-leg Jeans", "White Jeans", and "Belt" may be products that are part of the merchant's store product catalog based on the selection in web content 804 in FIG. 6.

The user interface 900 of FIG. 7 is only one example of a user interface that allows a merchant to manually select which of the determined matching products to display on a product page to a customer. The user interface is not limited to the appearance or functionality of interface 900 and may be provided differently for display on the merchant device 320.

Figure 8:
FIG. 8 illustrates an example user interface of a product page in an online store provided to a customer, according to one embodiment.

FIG. 8 illustrates an example user interface 1000 of a product page in an online store provided to the customer, according to one embodiment. The user interface 1000 of the product page is provided for display to the customer browsing the merchant's online store using customer device 330. FIG. 8 illustrates the product page of the striped t-shirt, and includes a section toward the bottom of the user interface 1000 that prompts the customer to "complete the look" using at least one of a plurality of matching products. Images of the plurality of matching products are provided by the interface, including an image of "Jeans" 1002a, an image of "Wide-leg Jeans" 1002b, and an image of "Belt" 1002c.

The images of "Jeans" 1002a, "Wide-leg Jeans" 1002b, and "Belt" 1002c are products that may have been determined to match the striped t-shirt by inputting the image of the striped t-shirt through the matching machine learning model 311 of the product matching engine 302, as described herein.

The images of the matching products 1002a, 1002b, and 1002c may correspond to the selection of matching products to display to the customer as configured by the merchant via user interface 900 of FIG. 7. In this example, the merchant selects, via the merchant device 320, to display the "Jeans", "Wide-leg Jeans", and "Belt" on the product page of the striped t-shirt. An indication of this selection may then be provided to the product matching engine 302, which then transmits web content having content related to the selected matching products for display on the customer device 330 in response to a request to load the product page of the striped t-shirt.

The user interface 1000 is only one example of a product page provided to a customer via the customer device 330 that includes content relating to products that match the product of the product page. The user interface 1000 of FIG. 8 is not limiting, and a user interface of a product page may have any appropriate appearance.

Example Methods

Figure 9:
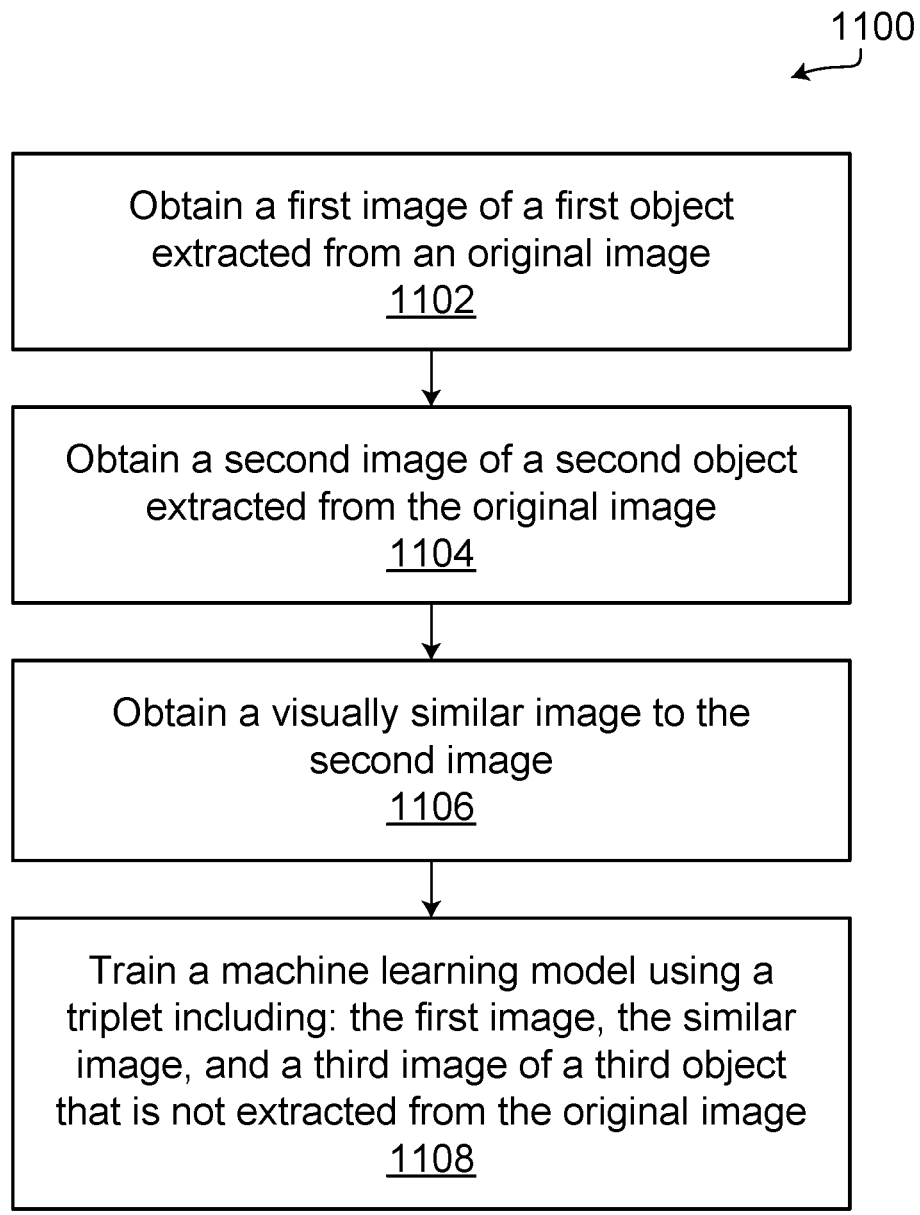
FIGS. 9 and 10 illustrates steps of computer-implemented methods, according to various embodiments.

FIG. 9 illustrates a computer-implemented method 1100, according to one embodiment. Not all of the steps in the method 1100 of FIG. 9 are necessary in all embodiments. Also, some of the steps may be substituted by other steps instead. The method may be performed by or on an e-commerce platform, although this is not necessary. In method 1100, the steps are described as being performed by the processor 304 of product matching engine 302 of FIG. 1, but this is only an example. For example, the method 1100 may instead be performed by another entity, which might or might not be part of an e-commerce platform. In one alternative example, some of the steps of the method 1100 may be performed by an entity separate from the product matching engine 302. For example, obtaining an image of an object extracted from an original image may be performed by another entity (e.g. another processor) separate from the product matching engine 302 itself. The product matching engine 302 might be limited to just training a machine learning model.

More generally, FIG. 9 does not even have to be limited to e-commerce. For example, the identification of matching objects may have applications outside of e-commerce, e.g. an interior designer or landscaper may use a computer to redesign a space, and the computer may suggest objects that visually match each other. The training of the machine learning model used by the computer may be implemented according to the method of FIG. 9 and any of the variations described herein.

At step 1102 of method 1100, the processor 304 obtains a first image of a first object extracted from an original image. For example, the product matching engine 302 may obtain a set of images and store the set of images in the memory 308 as part of the training images 309. The product matching engine 302 may then select an original image, and extract a first image of a first object from the original image. The extracted first image of the first object may also be saved as part of the training images 309.

In an example, the original image may be the original image 400 of the model standing in front of a brick wall and wearing a striped t-shirt and jeans, as shown in FIG. 2. One or more products in the original image 400 may be detected and extracted. The product matching engine may extract the image of the striped t-shirt 402 as the first image of the first object. Alternatively, the extracted image of the jeans 404 may be selected as the first image of the first object.

At step 1104, the processor 304 obtains a second image of a second object extracted from the original image. The product matching engine 302 may obtain an extracted image of an object that is different from the first image of the first object.

For instance, if the first image of the first object is the image of the striped t-shirt 402, the product matching engine 302 may obtain the image of the jeans 404 that has been extracted from the original image 400 as the second image. Alternatively, if the image of the jeans 404 is the first image of the first object, the product matching engine 302 may obtain the extracted image of the striped t-shirt as the second image.

At step 1106, the processor 304 may use the second image to obtain a similar image. The similar image may be visually similar to the second image and is not obtained from the original image.

For instance, if the image of the jeans 404 extracted from the original image 400 is the image of the second object, the product matching engine 302 may input the image of the jeans 404 into a similarity machine learning model 502, as shown in FIG. 3. The similarity machine learning model 502 may output an image of a product, such as the image of the wide-leg jeans 504, that is visually similar to the image of the jeans 404. The image of the wide-leg jeans 504 may originate from a source that is different from the source of the original image 400. For example, the image of the wide-leg jeans 504 may be from a store's online catalog from a previous season and the original image of the jeans 404 may be from the store's online catalog for the current season. Images from the online catalog for the current season may have been taken in front of a brick wall. Conversely, images from the online catalog from a previous season may have been taken in front of a blank background. As such, some contextual elements of the extracted images of the jeans 404 and the wide-leg jeans 504 may be different.

At step 1108, processor 304 may train a machine learning model using a triplet. The triplet may be one of a set of triplets used to train the machine learning model. The triplet may include: the first image of the first object, the similar image, and a third image of a third object that is not extracted from the original image.

For instance, as shown in FIG. 3, each image of the triplet 510 is input into the matching machine learning model 311. The first image of the first object may be the image of the striped t-shirt 402 extracted from the original image. The similar image may be the image of the wide-leg jeans 504, which was determined to be visually similar to the image of the jeans 404 extracted from the original image 400 through the use of the similarity machine learning model 502. The third image of a third object may be the image of the plaid pants 508 that has been extracted from the image 506. The image 506 is a different image from the original image 400. However, in some cases (like as shown in FIG. 3), the image 506 may originate from the same source (e.g., the same online catalog) as image 400 and includes similar contextual elements, such as the brick wall in the background.

In some embodiments, the first image of the first object may be the anchor of the triplet, and the similar image may be the positive of the triplet. Such is the case in the example in FIG. 3. In other embodiments, the first image of the first object may be the positive of the triplet, and the similar image may be the anchor of the triplet. In some embodiments, the third image may be the negative of the triplet. In some embodiments, the third image may be an image of a product extracted from a same image collection/source (e.g. online catalog) as the original image, although this is not necessary. In some embodiments, the third image may be the output of a trained machine learning model, e.g. an image of the anchor or positive may be put into a trained machine learning model, and the output used as the negative of the triplet.

In some embodiments, instead of the triplet including the first image of the first object, the triplet may include a similar image to the first image. For example, the triplet may include: a first similar image that is visually similar to the first image and not obtained from the original image; a second similar image that is visually similar to the second image and not obtained from the original image; and the third image. An example is FIG. 3 modified to additionally input image 402 into similarity machine learning model 502 and using the output as the anchor. In this situation, both the positive and the anchor would be different similar images, each visually similar to a respective different product image extracted from the original image 400.

In some embodiments, the similar image is at least one of: an image obtained using a trained similarity machine learning model, an alternative image of the second object, or an image created by modifying the second image of the second object.

For example, the product matching engine 302 may obtain the image of the jeans 404 as the second image of the second object. The second image may be used as an input to the trained similarity machine learning model 502 in order to obtain a visually similar image as shown in FIG. 3. The output of the similarity machine learning model 502 may be the image of the wide-leg jeans 504, which is the similar image to the image of the jeans 404. In some implementations, the similarity machine learning model 502 may be trained using triplets, and the weights of the model may be adjusted based on calculated triplet loss values.

In another example, the product matching engine 302 may obtain the image of the jeans 404 as the second image of the second object, and the product matching engine may then obtain a different image of the same pair of jeans as the similar image. The different image of the same pair of jeans may be an image uploaded by a verified reviewer on the jeans' product page in an online store. Alternatively, the product matching engine 302 may obtain the similar image by modifying the image of the jeans 404, such as by applying random noise/distortion to the image.

In some embodiments, obtaining the image using the trained similarity machine learning model may include inputting the second image to the trained similarity machine learning model. The trained similarity machine learning model may be trained to: obtain a vector representation (e.g. feature vector) of the second image, identify a corresponding image having a vector representation that is within a predetermined distance (e.g. Euclidean distance) from the vector representation of the second image, and output an indication of the corresponding image, the corresponding image being the similar image.

For example, in order to obtain the similar image of the wide-leg jeans 504, the product matching engine may input the second image, which may be the image of the jeans 404, into the similarity machine learning model 502. The similarity machine learning model 502 may determine a feature vector of the image of the jeans 404. In order to determine one or more product images that are most "similar" to the image of the jeans 404, the distances between the feature vector corresponding to the image of the jeans and the feature vectors of images of other products may be calculated. The vector representation of the image of the wide-leg jeans 504 may be a predetermined distance from the vector representation of the second image and may therefore be considered "similar". The similarity machine learning model 502 may then output an indication of the image of the wide-leg jeans 504, such that this image may be used in the triplet.

In some embodiments, the third image of the third object may be extracted from a different image having a same source as the original image. The source may be a set of digital images that originate from a same image collection. Images originating from a same image collection may mean that the original image and the different image may both be found in a same online catalog, a same electronic magazine, images from the webpage of a same retailer, etc. Both the original image and the different image may be stored as part of the training images 309 in the memory 308 of the product matching engine 302.

For example, the original image 400 as shown in FIG. 2, is an image of a model standing in front of a brick wall, wearing a striped t-shirt and jeans. The image of the striped t-shirt 402 may be the first image, and may be extracted from the original image 400. The different image may be the image 506 of the model standing in front of a brick wall, wearing a solid shirt and plaid pants, as shown in FIG. 3. The third image may be the image of the plaid pants 508 that may be extracted from the different image 506. The different image 506 and the original image 400 may have the same source. For instance, the images may originate from a store's online catalog for the current season. The images that make up the store's online catalog for the current season may be the collection of images.

In another embodiment, the third image may be extracted from a different image that does not have the same source as the original image, e.g. the third image may be obtained from another collection and/or from a social media application, etc.

In some embodiments, the first image is an anchor of the triplet, the similar image is a positive of the triplet, and the third image is a negative of the triplet. In other embodiments, the first image is the positive of the triplet and the similar image is the anchor of the triplet. In any case, the training may include inputting each of the anchor, the positive, and the negative into the machine learning model to obtain vector representations (e.g. feature vectors) of the anchor, the positive, and the negative. The training may also include computing a loss value based on a difference between a first distance and a second distance. The first distance may be based on a distance (e.g. Euclidean distance) between the vector representations of the anchor and positive, and the second distance may be based on a distance (e.g. Euclidean distance) between the vector representations of the anchor and negative.

For example, the matching machine learning model 311 may be trained with several triplets, including triplet 510 of FIGS. 3 and 4. The triplet may use the image of the striped t-shirt 402 obtained from the original image 400 as the anchor. The image of the wide-leg jeans 504, which is similar to the image of the jeans 404, may be assigned as the positive. The image of the plaid pants 508 may be assigned as the negative of the triplet 510. The anchor, the positive, and the negative, may each be separately input into the matching machine learning model 311, and feature vectors 602, 604, and 606 may be obtained for each image, respectively. The triplet loss value 608 may be calculated using the formula: $\|f(A)-f(P)\|^2-\|f(A)-f(N)\|^2$. The expression: $|f(A)-f(P)\|^2$ may represent the first distance and may be based on the Euclidean distance between the vector representation of the image of the striped t-shirt and the vector representation of the image of the wide-leg jeans. The expression: $\|f(A)-f(N)\|^2$ may represent the second distance and may be based on the Euclidean distance between the vector representation of the image of the striped t-shirt and the vector representation of the image of the plaid pants.

In some embodiments, the training may use a set of triplets that includes a subset of triplets for the original image. For each triplet of the subset of triplets: an anchor of the triplet may be the first image, and one of: a positive of the triplet may be the similar image and a negative of the triplet may be another image different from the third image and that is not extracted from the original image; or the positive of the triplet may be another image different from the similar image and that is visually similar to the second image and the negative of the triplet may be the third image; or the positive of the triplet may be another image that is visually similar to the second image and the negative of the triplet may be another image that is not extracted from the original image. The training images 309 stored in the memory 308 of the product matching engine 302 may include the first image, the similar image, and the third image, as well as images that are different from the similar image and visually similar to the second image, and other images that are not extracted from the original image.

For example, in order to train the matching machine learning model 311, the product matching engine 302 may create a set of triplets. Several of the triplets of the set of triplets may be created based on a same original image, such as original image 400 of FIG. 2. A first image, such as the image of the striped t-shirt 402 extracted from the original image 400, may be assigned as the anchor of a subset of triplets that are created based on the same original image. In some of the triplets of the subset of triplets, the positive of the triplet might not be the image of the wide-leg jeans 504, but may instead be a different image that is still visually similar to the image of the jeans 404. For instance, an image of a pair of white jeans of a similar cut to the jeans 404 in the original image 400 may be used as a positive. Different positive images may be obtained in the same manner as the similar image, such as through the use of the similarity machine learning model 502. In some of the triplets of the subset of triplets where the positive is not the image of the wide-leg jeans 504, the negative might be the image of the plaid pants 508. In some other of the triplets of the subset of triplets where the positive is not the image of the wide-leg jeans 504, the negative might be a different image than the image of the plaid pants 508.

In some of the triplets of the subset of triplets, the negative of the triplet might not be the image of the plaid pants 508 but may be a different image that is not extracted from the original image 400. As an example, the negative may be an image of a knee-length polka-dotted skirt, which might not be found in the original image 400. In some of the triplets of the subset of triplets where the negative is not the image of the plaid pants 508, the positive might be the image of the wide-leg jeans 504. In some other of the triplets of the subset of triplets where the negative is not the image of the plaid pants 508, the negative might be a different image than the image of the wide-leg jeans 504.

In some embodiments, after training the machine learning model 311 to obtain a trained machine learning model, the method 1100 may further include receiving, from a device associated with a user, a request for web content. The web content may include an image of a first product. The method 1100 may also include determining one or more matching products based on distances between a vector representation (e.g. feature vector) of the image of the first product and vector representations of other products obtained using the trained machine learning model. The method 1100 may further include a step of transmitting, for display on the user device, the web content including one or more images of the one or more matching products. After the matching machine learning model 311 is trained, it may be used in order to provide matching product recommendations to either a merchant using the merchant device 320 or a customer using the customer device 330.

In one implementation, the merchant using the merchant device 320 may request web content, such as the user interface 900 of FIG. 7 that allows the merchant to determine which matching products may later be presented to the customer. The request may be sent by the merchant device 320 to the product matching engine 302. The first image may be the image of the striped t-shirt shown in interface 900. The product matching engine 302 may then determine one or more matching products to the image of the striped t-shirt. To do so, the product matching engine 302 may obtain the vector representation (e.g. feature vector) of the image of the striped t-shirt. The distances between the vector representation of the image of the striped t-shirt and vector representations of images of other products may be calculated, and the images corresponding to the closest distances may be considered to be matching. The vector representations of images of other products may have been obtained by inputting the images of the other products into the trained matching machine learning model 311 and storing the vector representations as part of the feature vectors 313. The product matching engine 302 may then transmit images corresponding to the feature vectors having the closest distances to the vector representation of the image of the t-shirt to the merchant device 320. This is illustrated in FIG. 7, in which the user interface 900 displays images of the following products that have been determined to match the striped t-shirt: "Jeans", "Wide-leg Jeans", "White Jeans", and "Belt".

In another implementation, the customer using the customer device 330 may request web content, such as the product page for the striped t-shirt shown on the user interface 1000 of FIG. 8. The request may be sent by the customer device 330 to the product matching engine 302. The first image may be the image of the striped t-shirt shown in interface 1000. The product matching engine 302 may then determine one or more matching products by calculating the distances between the vector representation (e.g. feature vector) of the image of the striped t-shirt and the vector representations of other product images. Once the product matching engine 302 has determined which images match the striped t-shirt, the product matching engine transmits the web content for display as interface 1000 that includes images of the following matching products: "Jeans" 1002a, "Wide-leg Jeans" 1002b, and "Belt" 1002c.

In some embodiments, if a vector representation of the image of the first product is not already stored, the method 1100 may further include inputting the image of the first product into the trained machine learning model to obtain the vector representation of the image of the first product.

For example, if the image of the first product is newly uploaded by a merchant adding a new product collection to their online store, then the model might not yet have produced a vector representation of the first image. Consequently, the vector representation of the first image might not be stored as part of the feature vectors 313 in the memory 308 of the product matching engine 302. As such, the image of the first product may be input into the trained matching machine learning model 311 in order to obtain the vector representation of the image of the first product to determine the one or more matching products.

In some embodiments, the extracting the first object and the second object from the original image may include: identifying the first object and the second object in the original image, isolating a first region of the original image including the first object and a first contextual element, and isolating a second region of the original image including the second object and a second contextual element. The extracting may also include storing the first region as the first image and the second region as the second image. The product matching engine 302 may identify and extract two or more objects from an image stored in the training images 309, and may then also store the extracted images as part of the training images 309 in the memory 308.

For example, the original image 400 is shown in FIG. 2. The boxes overlaying the striped t-shirt and the jeans in the original image indicate the identification of the first and the second object, respectively. The image of the striped t-shirt 402 may be extracted from the original image 400, and the image of the jeans 404 may be extracted from the original image. The image of the striped t-shirt 402 and the image of the jeans 404 may then be stored as part of the training images 409 in the memory 308 of the product matching engine 302. These images 402 and 404 do not just include the products themselves, but also include one or more contextual elements. Examples of contextual elements include: lighting conditions, the pixels of the brick wall adjacent to the product, the neck and arms of the model in image 402, and the hand, belt, and legs of the model in image 404.

Figure 10:
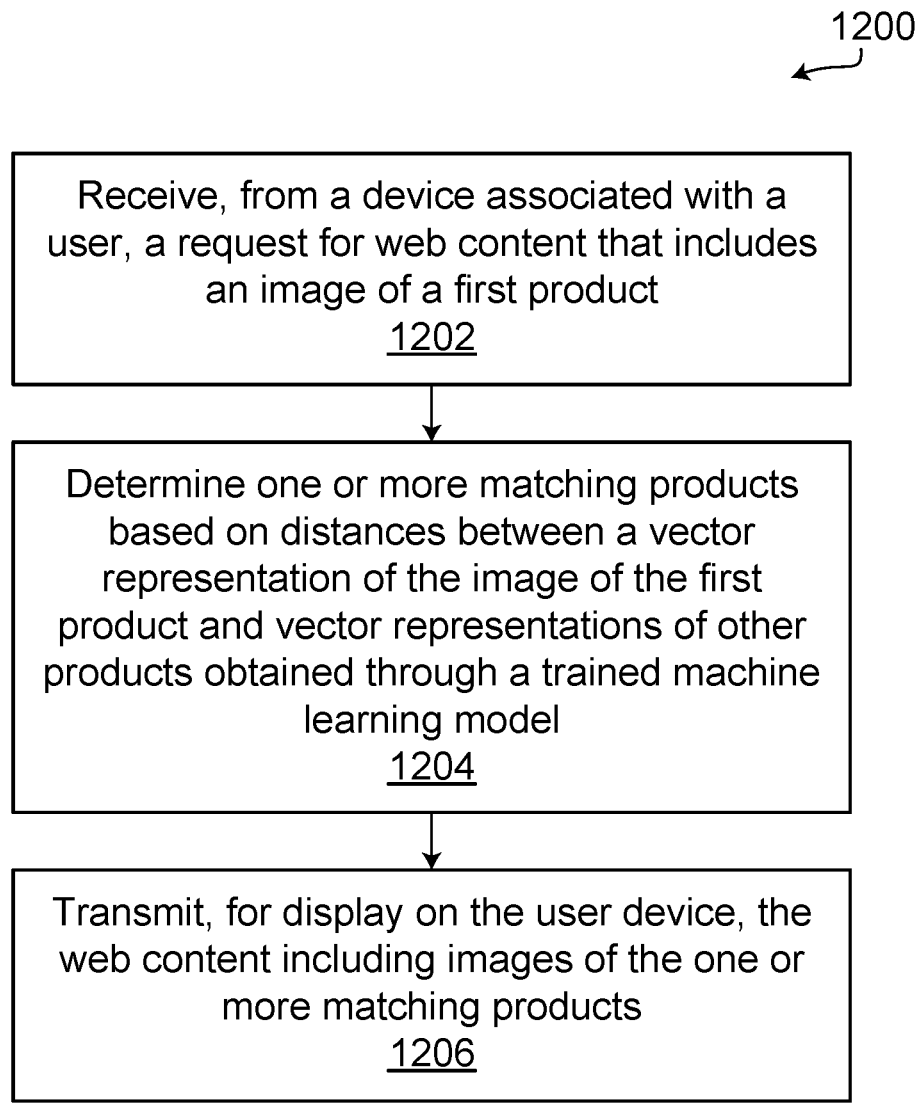

FIG. 10 illustrates a computer-implemented method 1200, according to another embodiment. Not all of the steps in the method 1200 of FIG. 10 are necessary in all embodiments. Also, some of the steps may be substituted by other steps instead. The method may be performed by or on an e-commerce platform, although this is not necessary. In method 1200, the steps are described as being performed by the processor 304 of product matching engine 302 of FIG. 1, but this is only an example. For example, the method 1200 may instead be performed by another entity, which might or might not be part of an e-commerce platform. More generally, FIG. 10 does not even have to be limited to e-commerce. For example, the identification of matching products may have applications outside of e-commerce, e.g. an interior designer or landscaper may use a computer to redesign a space, and the computer may suggest products that visually match each other.

At step 1202 of method 1200, the processor 304 may receive, from a device associated with a user, a request for web content. The web content includes an image of a first product.

In one example, the product matching engine 302 may receive a request from a merchant device 320 for web content, such as a request for the content of the user interface 900 of FIG. 7. The image of the striped t-shirt displayed in the user interface 900 may be the image of the first product.

In another example, the product matching engine 302 may receive a request from a customer device 320 for web content, such as a request for the product page for the striped t-shirt displayed in the user interface 1000 of FIG. 8. The image of the striped t-shirt displayed in the user interface 1000 may be the image of the first product.

At step 1204, the processor 304 may determine one or more matching products based on distances between a vector representation of the image of the first product and vector representations of other products obtained through/using/via a trained machine learning model. The trained machine learning model may have been trained according to any of the embodiments described earlier. For example, the trained machine learning model may have been trained (e.g. via triplet loss training) using a set of triplets including a triplet that may include: (1) a first image extracted from an original image (e.g. where the first image is one of the anchor or the positive of the triplet), (2) an image that is visually similar to a second image extracted from the original image (e.g. where the visually similar image is the other of the anchor or the positive of the triplet), and (3) a third image that is not extracted from the original image (e.g. where the third image is the negative of the triplet).

For example, the processor 304 of the product matching engine 302 may obtain the vector representation of the image of the striped t-shirt from the feature vectors 313 stored in the memory 308. The distance between the vector representation of the image of the striped t-shirt and the vector representations of images of other products stored in the feature vectors 313 may be calculated to determine one or more images of products that match the striped t-shirt. The feature vectors 313 may be obtained by inputting images into the trained matching machine learning model 311.

The matching machine learning model 311 may be trained using the triplet loss method, and (in one example) one of the triplets used to train the model may be triplet 510 of FIG. 3. For the triplet 510, the image of the striped t-shirt 402 is the anchor, which may have been extracted from the original image 400. The positive of the triplet 510 may be the image of the wide-leg jeans 504, which is an image that is visually similar to the image of the jeans 404 (i.e. the second image) extracted from the original image 400. The negative of the triplet 510 is the image of the plaid pants 508, which has been extracted from a different image 506 than the original image 400.

At step 1206 of method 1200, the processor may transmit, for display on the user device, the web content including one or more images of the one or more matching products.

For example, if the request for the web content was the request sent from the merchant device 320 for the content displayed on the user interface 900, the product matching engine 302 may then transmit, to merchant device 320, images corresponding to the feature vectors having the closest distances to the vector representation of the image of the t-shirt. This is illustrated in FIG. 7, in which the user interface 900 displays images of the following products that have been determined to match the striped t-shirt: "Jeans", "Wide-leg Jeans", "White Jeans", and "Belt".

In another example, if the request for the web content was the request for the striped t-shirt's product page sent from the customer device 330, the product matching engine may transmit web content that includes images of the following matching products: "Jeans" 1002a, "Wide-leg Jeans" 1002b, and "Belt" 1002c, as illustrated in FIG. 8.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 11:
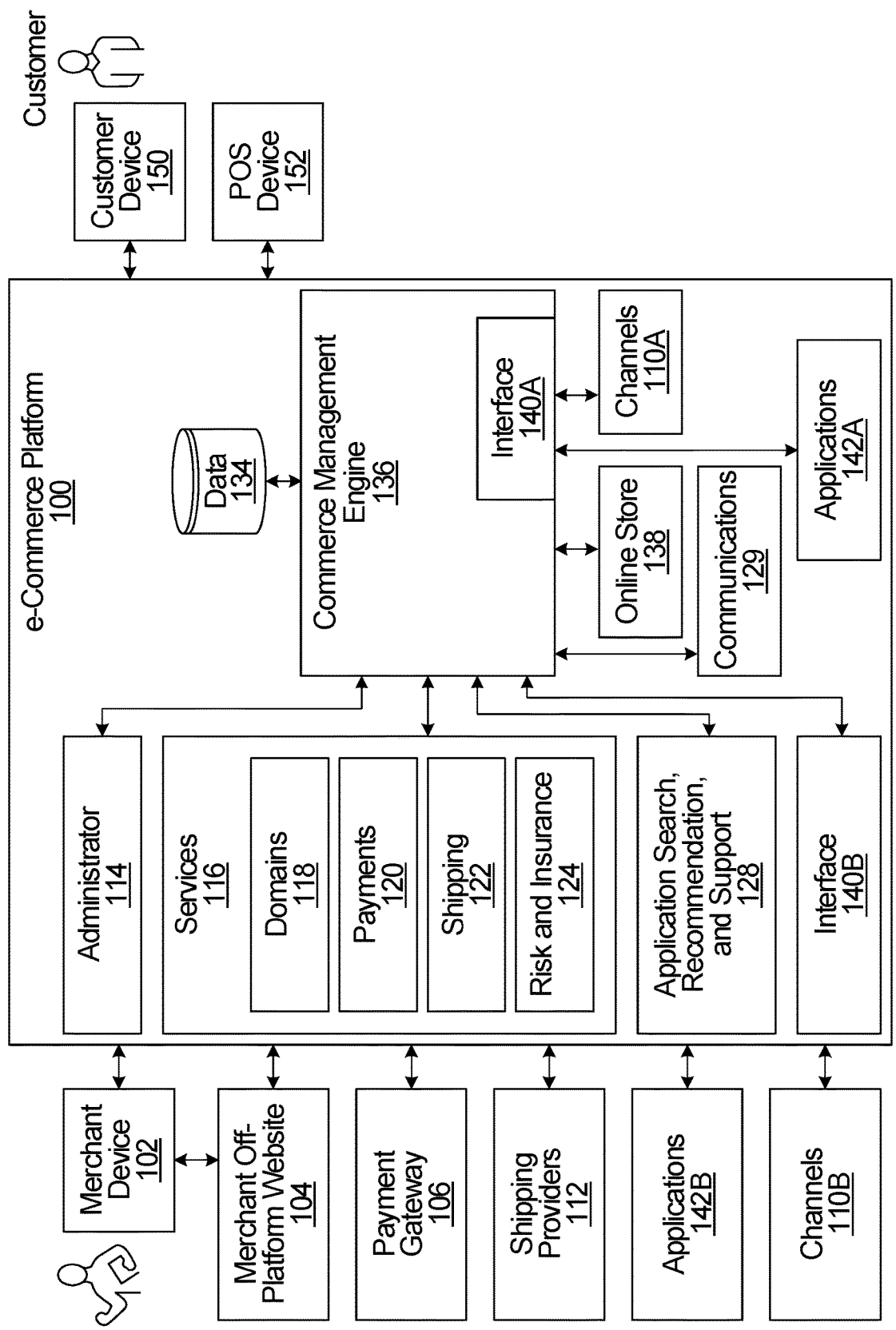
FIG. 11 is a block diagram of an e-commerce platform, according to one embodiment.

FIG. 11 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 11, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. . . . In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 12:
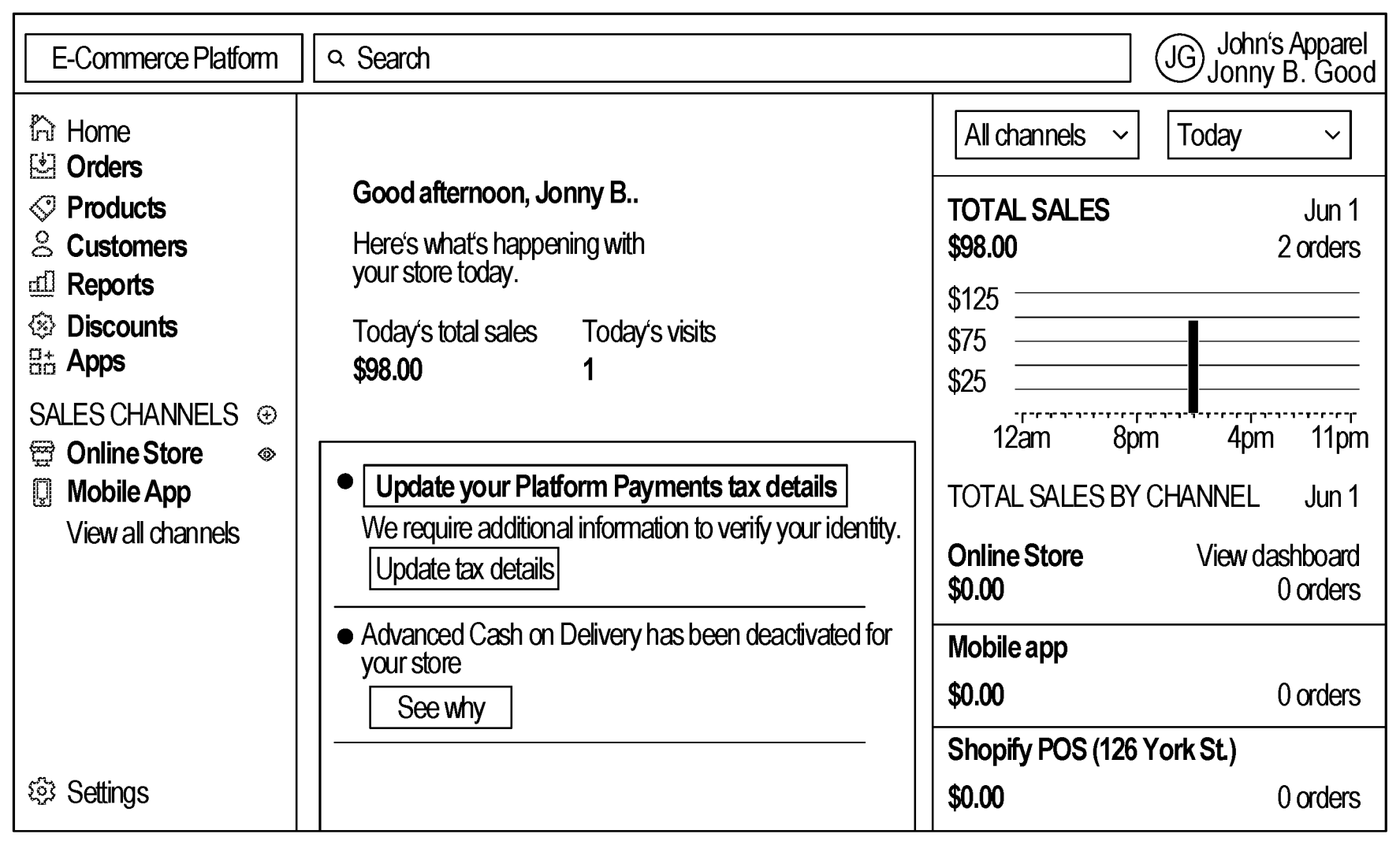

FIG. 12 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 12. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 11, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Determining Matching Products Using the e-Commerce Platform 100

Figure 13:
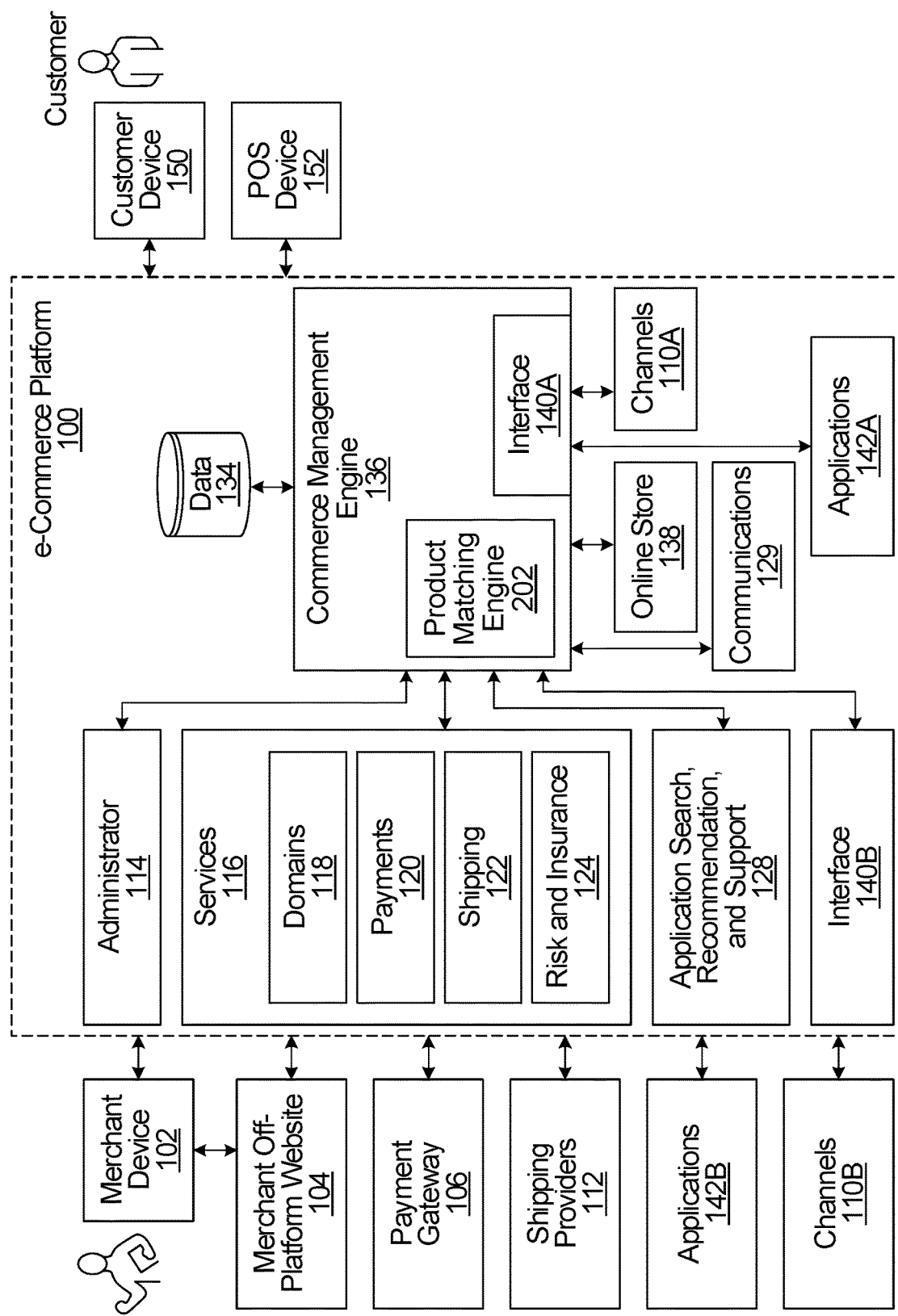
FIG. 13 illustrates the e-commerce platform of FIG. 11, but with a product matching engine, according to one embodiment.

FIG. 13 illustrates the e-commerce platform 100 of FIG. 11, but with the addition of a product matching engine 202. The product matching engine 202 may be included as part of the commerce management engine 136. The product matching engine 202 may perform the methods disclosed herein, e.g. the methods described earlier in relation to FIGS. 9 and/or 10. The product matching engine 202 may be product matching engine 302 described earlier.

The product matching engine 202 may be implemented by one or more general-purpose processors that execute instructions stored in a memory (e.g. in memory that is part of the data 134) or stored in another non-transitory computer-readable medium. The instructions, when executed, cause the product matching engine 202 to perform the operations of the product matching engine 202, e.g., operations relating to obtaining a first image and a second image from an original image, using the second image to obtain a visually similar image, and training a machine learning model using a triplet that includes the first image and the visually similar image. Alternatively, some or all of the product matching engine 202 may be implemented using dedicated circuitry, such as an ASIC, a GPU, or a programmed FPGA. In some embodiments, the product matching engine 202 may be located inside the e-commerce platform 100 but external to, and coupled to, the commerce management engine 136. In some embodiments, the product matching engine 202 may instead be located externally to the e-commerce platform 100 and possibly coupled to the commerce management engine 136.

Although the product matching engine 202 in FIG. 13 is illustrated as a distinct component of the e-commerce platform 100 in commerce management engine 136, this is only an example. The product matching engine 202 could also or instead be provided by another component residing within or external to the e-commerce platform 100. In some embodiments, either or both of the applications 142A-B may provide the product matching engine 202 that implements the functionality described herein. The location of the product matching engine 202 is implementation specific. In some implementations, the product matching engine 202 is provided at least in part by an e-commerce platform, either as a core function of the e-commerce platform or as an application or service supported by or communicating with the e-commerce platform.

In some embodiments, at least a portion of the product matching engine 202 could be implemented in a user device (e.g. customer device 150 and/or merchant device 102). For example, the customer device 150 and/or the merchant device 102 could store and run at least some of the product matching engine 202 locally as a software application.

Although the embodiments described herein may be implemented using the product matching engine 202 in e-commerce platform 100, the embodiments are not limited to the specific e-commerce platform 100 of FIGS. 11 to 13 and could be used in connection with any e-commerce platform. Also, the embodiments described herein need not necessarily be implemented in association with an e-commerce platform, but might instead be implemented as a standalone component or service, as previously described.

Finally, although the primary examples presented herein are in relation to e-commerce, the subject matter is not limited to e-commerce. For example, the matching machine learning model 311 may be trained and used in relation to images of objects outside of e-commerce. For example, an interior designer or landscaper may use the product matching engine 302 to receive recommendations for objects in an interior or exterior space that complement each other.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
obtaining a first image of a first object extracted from an original image;
obtaining a second image of a second object extracted from the original image;
using the second image to obtain a similar image, wherein the similar image is visually similar to the second image and is not obtained from the original image; and
training a machine learning model using a triplet including:
the first image of the first object,
the similar image, and
a third image of a third object that is not extracted from the original image.

2. The computer-implemented method of claim 1, wherein the similar image is at least one of:
an image obtained using a trained similarity machine learning model,
an alternative image of the second object, or
an image created by modifying the second image of the second object.

3. The computer-implemented method of claim 2, wherein obtaining the image using the trained similarity machine learning model comprises inputting the second image into the trained similarity machine learning model, and wherein the trained similarity machine learning model is trained to:
obtain a vector representation of the second image,
identify a corresponding image having a vector representation that is within a predetermined distance from the vector representation of the second image, and
output an indication of the corresponding image, the corresponding image being the similar image.

4. The computer-implemented method of claim 1, wherein extracting the first object and the second object from the original image comprises:
identifying the first object and the second object in the original image;
isolating a first region of the original image including the first object and a first contextual element;
isolating a second region of the original image including the second object and a second contextual element; and
storing the first region as the first image and the second region as the second image.

5. The computer-implemented method of claim 1, wherein:
the first image is an anchor of the triplet, the similar image is a positive of the triplet, and the third image is a negative of the triplet,
the training including inputting each of the anchor, the positive, and the negative into the machine learning model to obtain vector representations of the anchor, the positive, and the negative, and computing a loss value based on a difference between a first distance and a second distance, the first distance based on a distance between the vector representations of the anchor and positive, and the second distance based on a distance between the vector representations of the anchor and negative.

6. The computer-implemented method of claim 1, wherein the training uses a set of triplets that includes a subset of triplets for the original image, wherein for each triplet of the subset of triplets:
an anchor of the triplet is the first image, and one of:
a positive of the triplet is the similar image and a negative of the triplet is another image different from the third image and that is not extracted from the original image, or
the positive of the triplet is another image different from the similar image and that is visually similar to the second image and the negative of the triplet is the third image, or
the positive of the triplet is another image that is visually similar to the second image and the negative of the triplet is another image that is not extracted from the original image.

7. The computer-implemented method of claim 1, wherein, after training the machine learning model to obtain a trained machine learning model, the method further comprises:
receiving, from a device associated with a user, a request for web content, wherein the web content includes an image of a first product;
determining one or more matching products based on distances between a vector representation of the image of the first product and vector representations of other products obtained using the trained machine learning model; and
transmitting, for display on the user device, the web content including one or more images of the one or more matching products.

8. The computer-implemented method of claim 7, wherein, if a vector representation of the image of the first product is not already stored, the method further comprises inputting the image of the first product into the trained machine learning model to obtain the vector representation of the image of the first product.

9. The computer-implemented method of claim 1, wherein the third image of the third object is extracted from a different image having a same source as the original image, wherein the source is a set of digital images that originate from a same image collection.

10. A system comprising:
a memory to store images including an original image; and
at least one processor to:
obtain a first image of a first object extracted from the original image;
obtain a second image of a second object extracted from the original image;
use the second image to obtain a similar image, wherein the similar image is visually similar to the second image and is not obtained from the original image; and
train a machine learning model using a triplet including:

the first image of the first object,
the similar image, and
a third image of a third object that is not extracted from the original image.

11. The system of claim 10, wherein the similar image is at least one of:
an image obtained using a trained similarity machine learning model,
an alternative image of the second object, or
an image created by modifying the second image of the second object.

12. The system of claim 11, wherein the at least one processor is to obtain the image using the trained similarity machine learning model by performing operations including inputting the second image into the trained similarity machine learning model, and wherein the trained similarity machine learning model is trained to:
obtain a vector representation of the second image,
identify a corresponding image having a vector representation that is within a predetermined distance from the vector representation of the second image, and
output an indication of the corresponding image, the corresponding image being the similar image.

13. The system of claim 10, wherein to extract the first object and the second object from the original image, the at least one processor is to:
identify the first object and the second object in the original image;
isolate a first region of the original image including the first object and a first contextual element;
isolate a second region of the original image including the second object and a second contextual element; and
store the first region as the first image and the second region as the second image.

14. The system of claim 10, wherein:
the first image is an anchor of the triplet, the similar image is a positive of the triplet, and the third image is a negative of the triplet,
the at least one processor is to train the machine learning model by performing operations including inputting each of the anchor, the positive, and the negative into the machine learning model to obtain vector representations of the anchor, the positive, and the negative,
and the at least one processor is to compute a loss value based on a difference between a first distance and a second distance, the first distance based on a distance between the vector representations of the anchor and positive, and the second distance based on a distance between the vector representations of the anchor and negative.

15. The system of claim 10, wherein training the machine learning model uses a set of triplets that includes a subset of triplets for the original image, wherein for each triplet of the subset of triplets:
an anchor of the triplet is the first image, and one of:
a positive of the triplet is the similar image and a negative of the triplet is another image different from the third image and that is not extracted from the original image, or
the positive of the triplet is another image different from the similar image and that is visually similar to the second image and the negative of the triplet is the third image, or
the positive of the triplet is another image that is visually similar to the second image and the negative of the triplet is another image that is not extracted from the original image.

16. The system of claim 10, wherein, after training the machine learning model to obtain a trained machine learning model, the at least one processor is to:
receive, from a device associated with a user, a request for web content, wherein the web content includes an image of a first product;
determine one or more matching products based on distances between a vector representation of the image of the first product and vector representations of other products obtained using the trained machine learning model; and
instruct transmission of the web content for display on the user device, the web content including one or more images of the one or more matching products.

17. The system of claim 16, wherein, if a vector representation of the image of the first product is not already stored, the at least one processor is to input the image of the first product into the trained machine learning model to obtain the vector representation of the image of the first product.

18. The system of claim 10, wherein the at least one processor is to extract the third image of the third object from a different image having a same source as the original image, wherein the source is a set of digital images that originate from a same image collection.

19. A non-transitory computer readable medium having stored thereon computer-executable instructions that, when executed by at least one processor, cause the at least one processor to perform operations comprising:
obtaining a first image of a first object extracted from an original image;
obtaining a second image of a second object extracted from the original image;
using the second image to obtain a similar image, wherein the similar image is visually similar to the second image and is not obtained from the original image; and
training a machine learning model using a triplet including:
the first image of the first object,
the similar image, and
a third image of a third object that is not extracted from the original image.

* * * * *